(12) United States Patent
Nakamura et al.

(10) Patent No.: US 7,315,981 B2
(45) Date of Patent: Jan. 1, 2008

(54) XPATH EVALUATION METHOD, XML DOCUMENT PROCESSING SYSTEM AND PROGRAM USING THE SAME

(75) Inventors: Hiroaki Nakamura, Yokohama (JP); Hironobu Takagi, Tokyo (JP); Madoka Yuriyama, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 658 days.

(21) Appl. No.: 10/375,970

(22) Filed: Feb. 28, 2003

(65) Prior Publication Data

US 2003/0163285 A1    Aug. 28, 2003

(30) Foreign Application Priority Data

Feb. 28, 2002 (JP) .............................. 2002-053265
Sep. 13, 2002 (JP) .............................. 2002-267625

(51) Int. Cl.
*G06F 15/00* (2006.01)
*G06F 17/00* (2006.01)
(52) U.S. Cl. ...................... 715/513; 715/511; 715/523
(58) Field of Classification Search ................ 715/513, 715/511, 523
See application file for complete search history.

(56) References Cited

U.S. PATENT DOCUMENTS

| 7,096,224 | B2 * | 8/2006 | Murthy et al. ............. 707/100 |
| 2004/0010752 | A1 * | 1/2004 | Chan et al. .................. 715/513 |
| 2004/0010754 | A1 * | 1/2004 | Jones ......................... 715/513 |
| 2004/0060007 | A1 * | 3/2004 | Gottlob et al. .............. 715/513 |

OTHER PUBLICATIONS

Skonnard, Aaron; Addressing Infosets with XPath; Jul. 2000; The XML Files; MSDN Magazine.*
Altmel, Mehmet et al.; Efficient Filtering of XML Documents for Selective Dissemination of Information; 2000; Proceedings of the 26th VLDB Conference, Cairo, Egypt; pp. 53-64.*

* cited by examiner

*Primary Examiner*—Doug Hutton
*Assistant Examiner*—N Hillery
(74) *Attorney, Agent, or Firm*—Ronald L. Drumheller; Marc D. McSwain

(57) ABSTRACT

To efficiently search an evaluation result of a plurality of XPath expressions with respect to a data file such as an XML document: an evaluation result of an XPath expression is obtained by generating a data structure with a redundant element by evaluating what common part or dependency has been omitted from a plurality of XPath expressions to be evaluated, and then the data structure is used with respect to a data file to be processed.

5 Claims, 29 Drawing Sheets

[Figure 1]
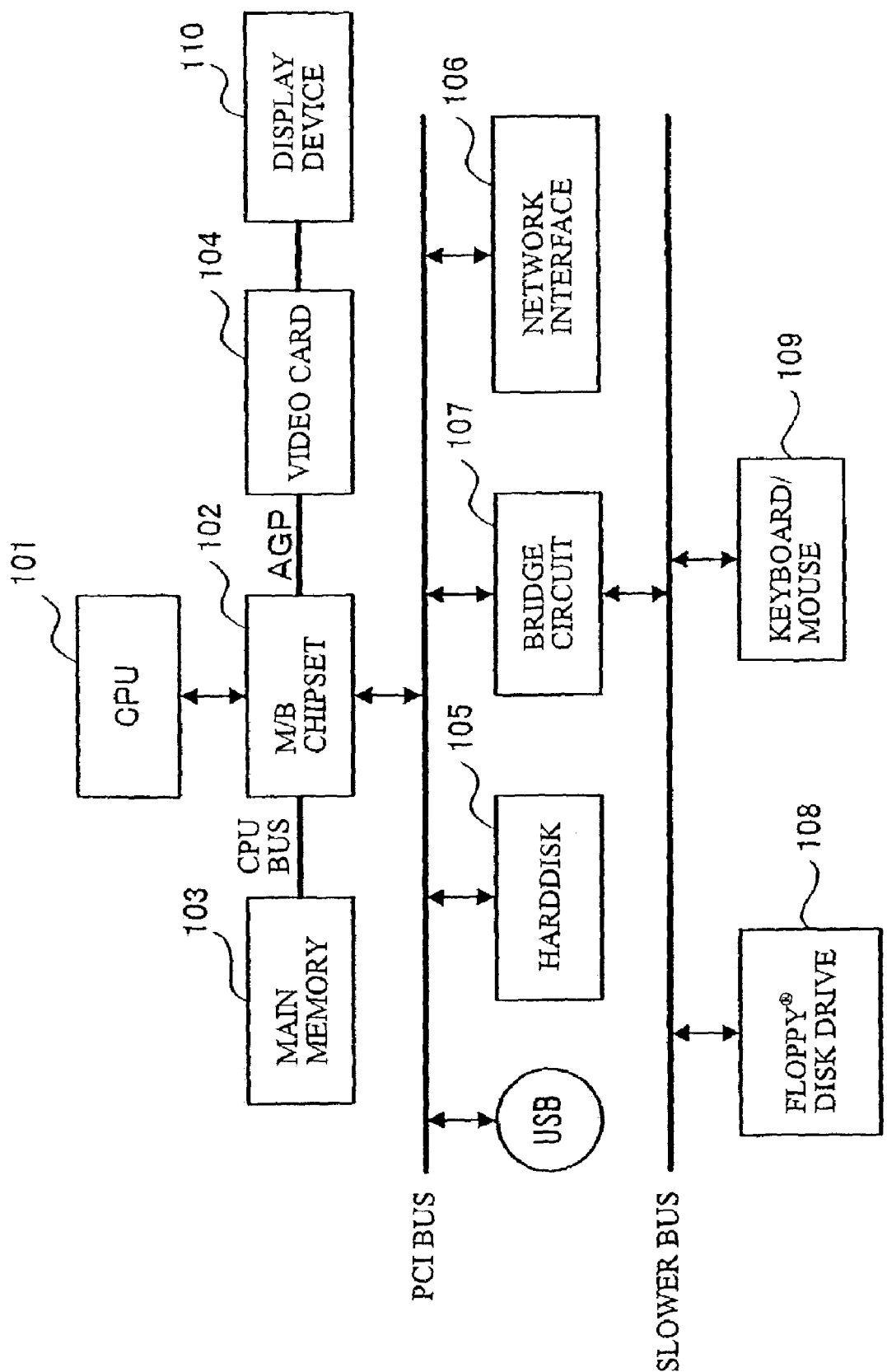

[Figure 2]
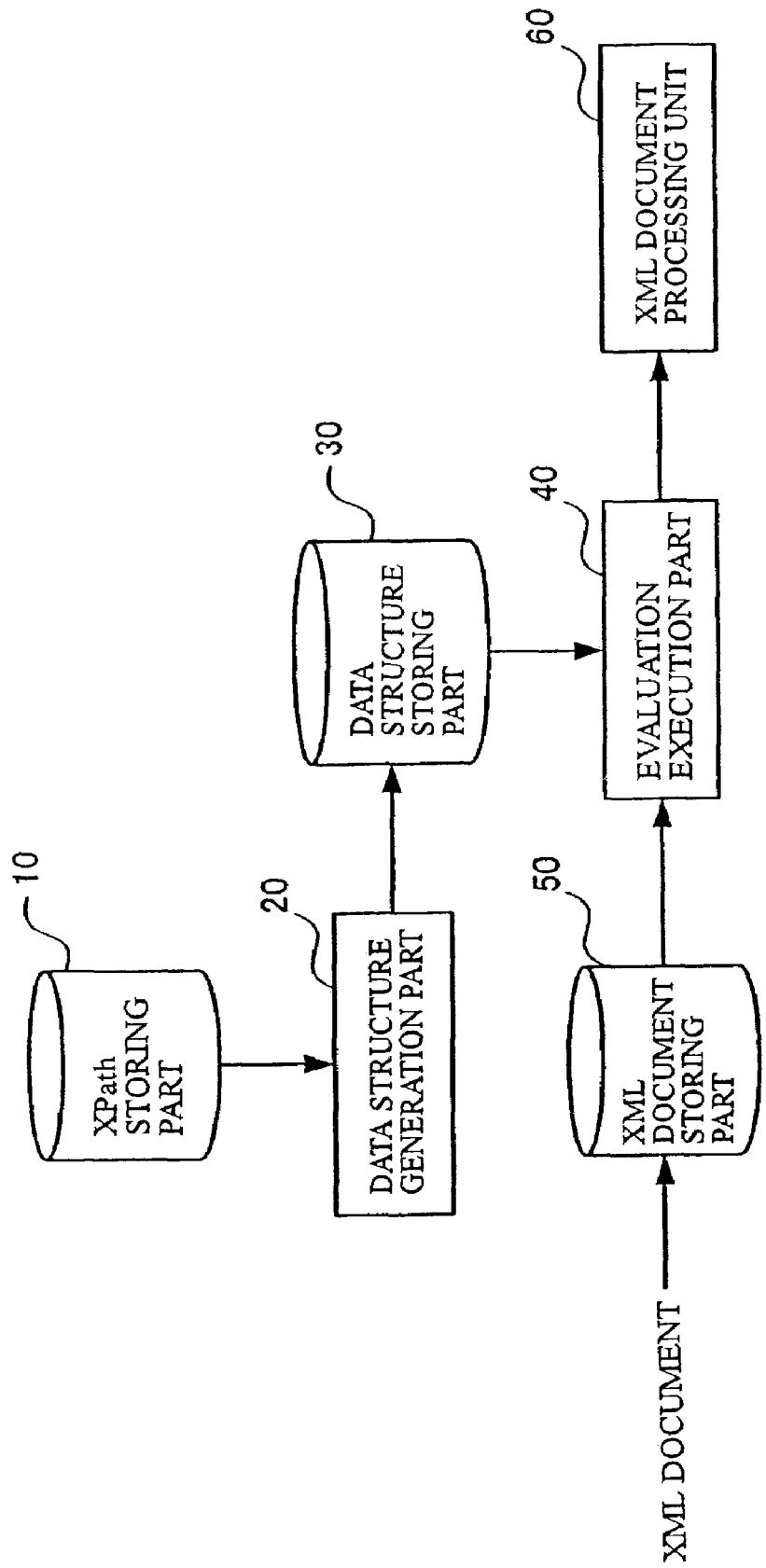

[Figure 3]
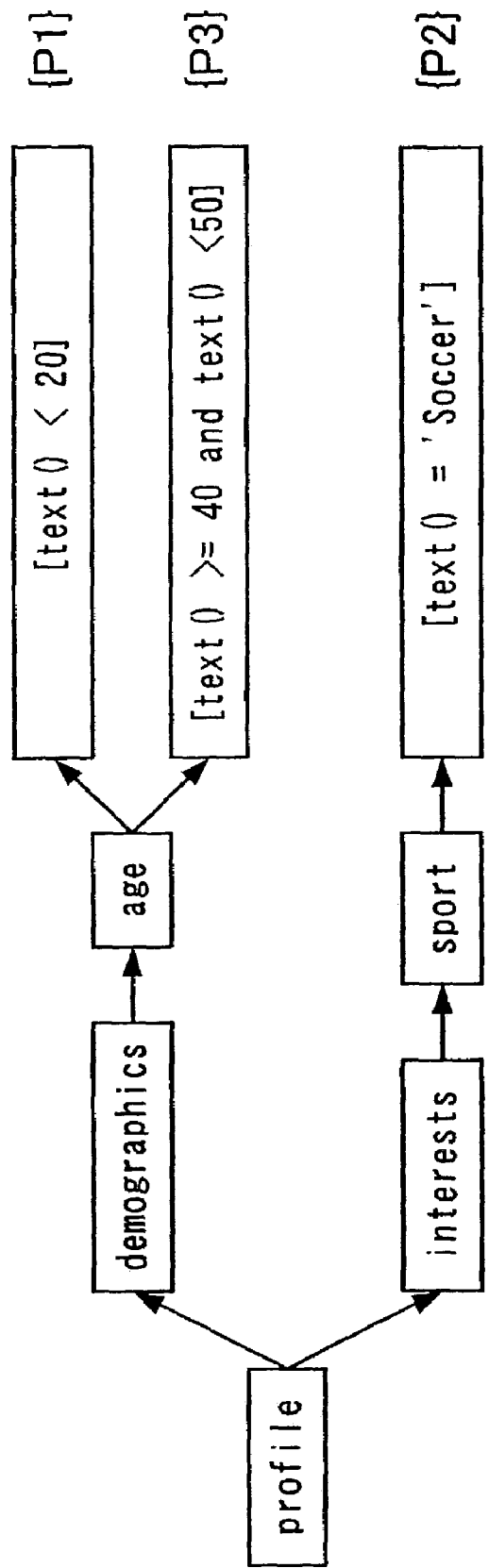

[Figure 4]

```
D1:
<profile>
    <name>Alan</name>
    <demographics>
        <age>35</age>
    </demographics>
    <location>
        <city>Osaka</city>
    </location>
    <interests>
        <sport>Soccer</sport>
        <music>Classical</music>
        <book>History</book>
    </interests>
</profile>
```

[Figure 5]
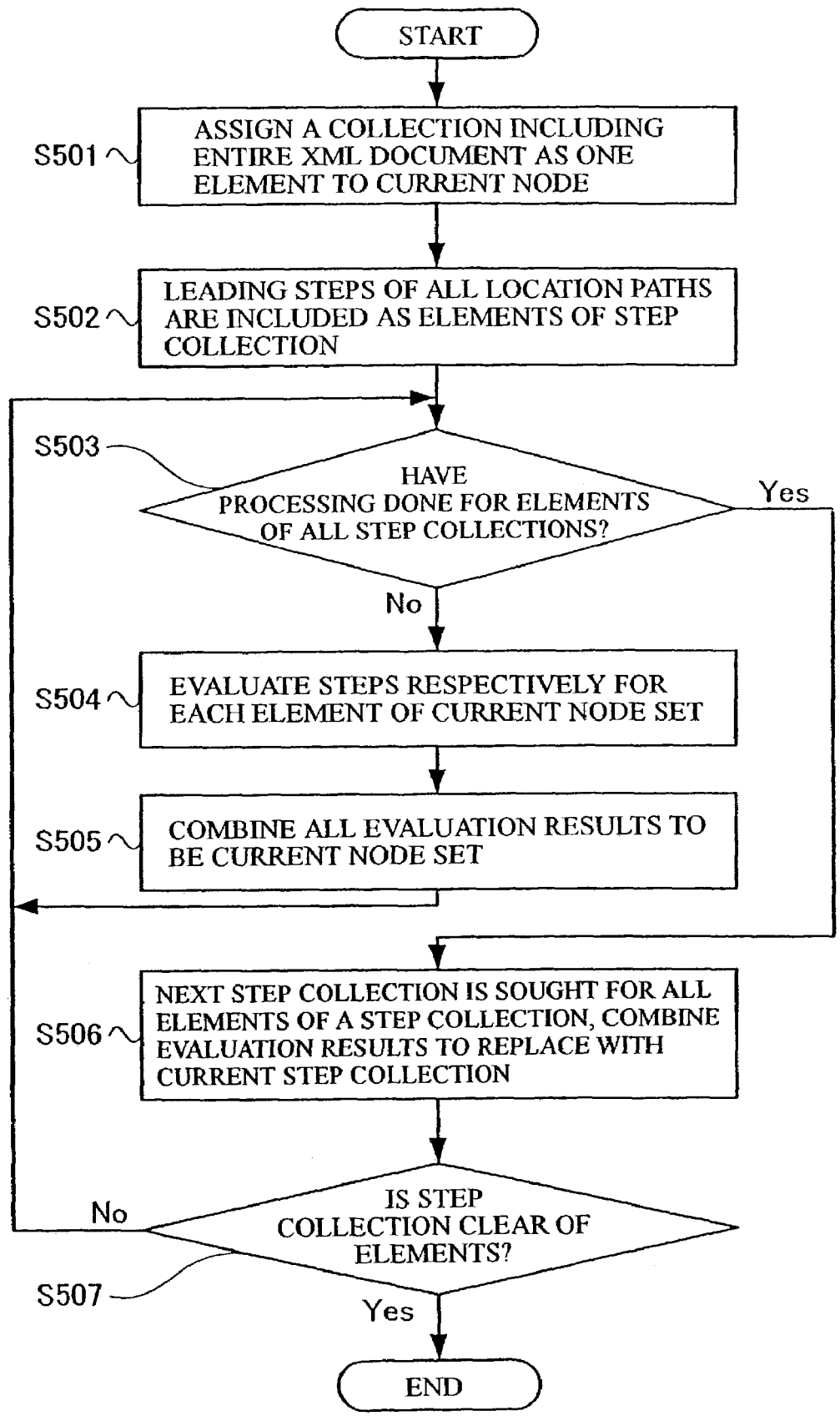

[Figure 6]
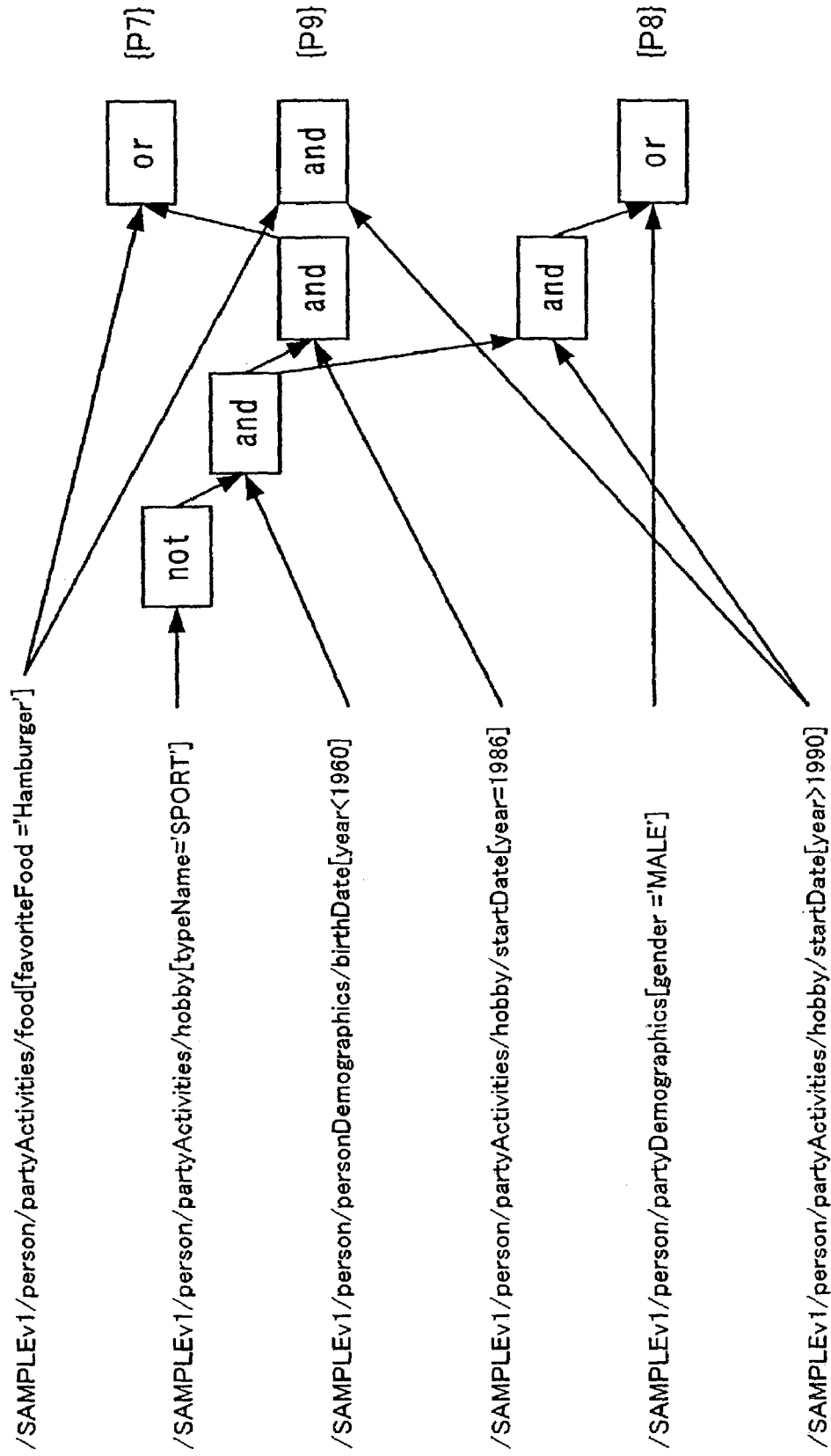

[Figure 7]
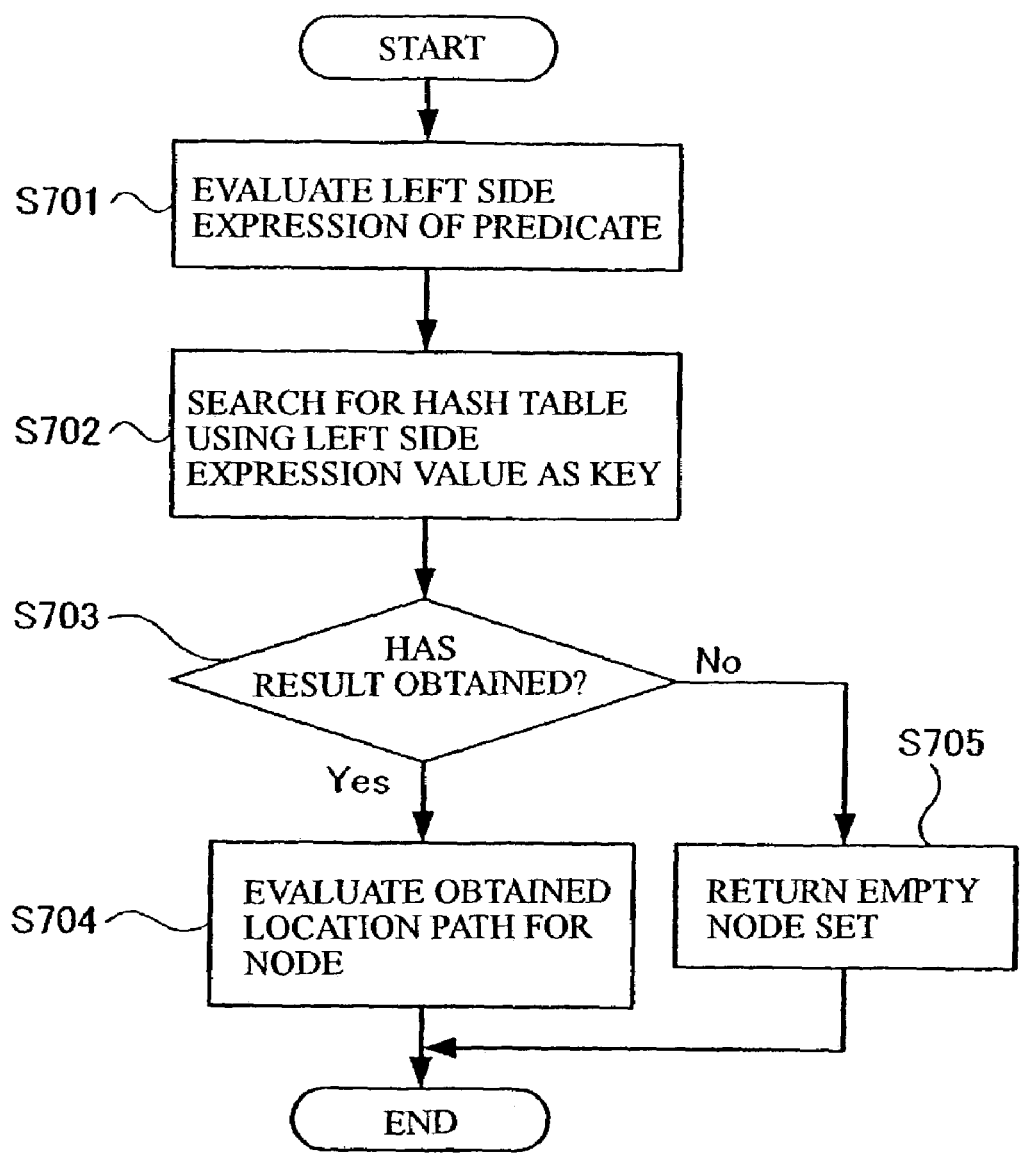

[Figure 8]
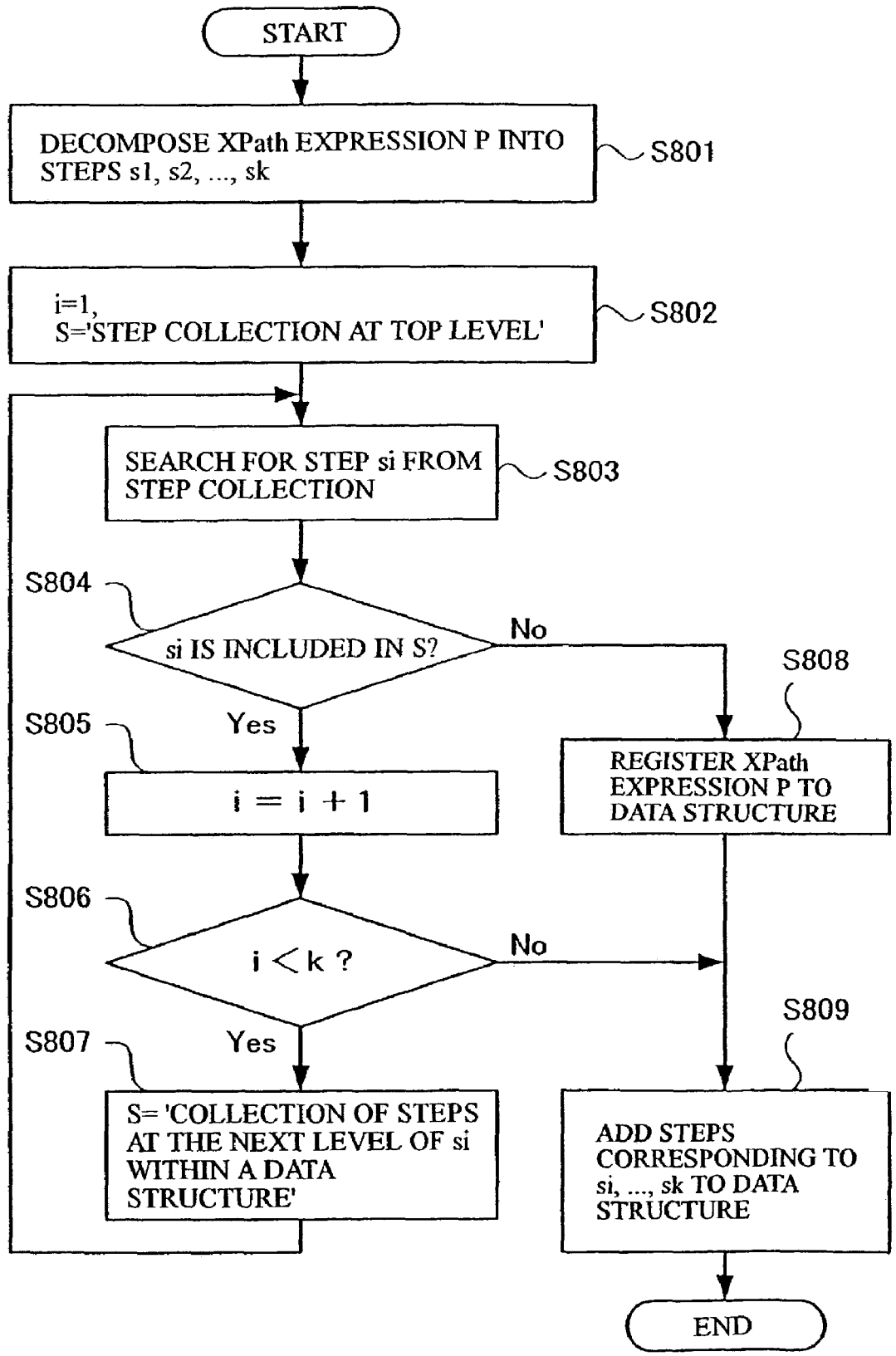

[Figure 9]
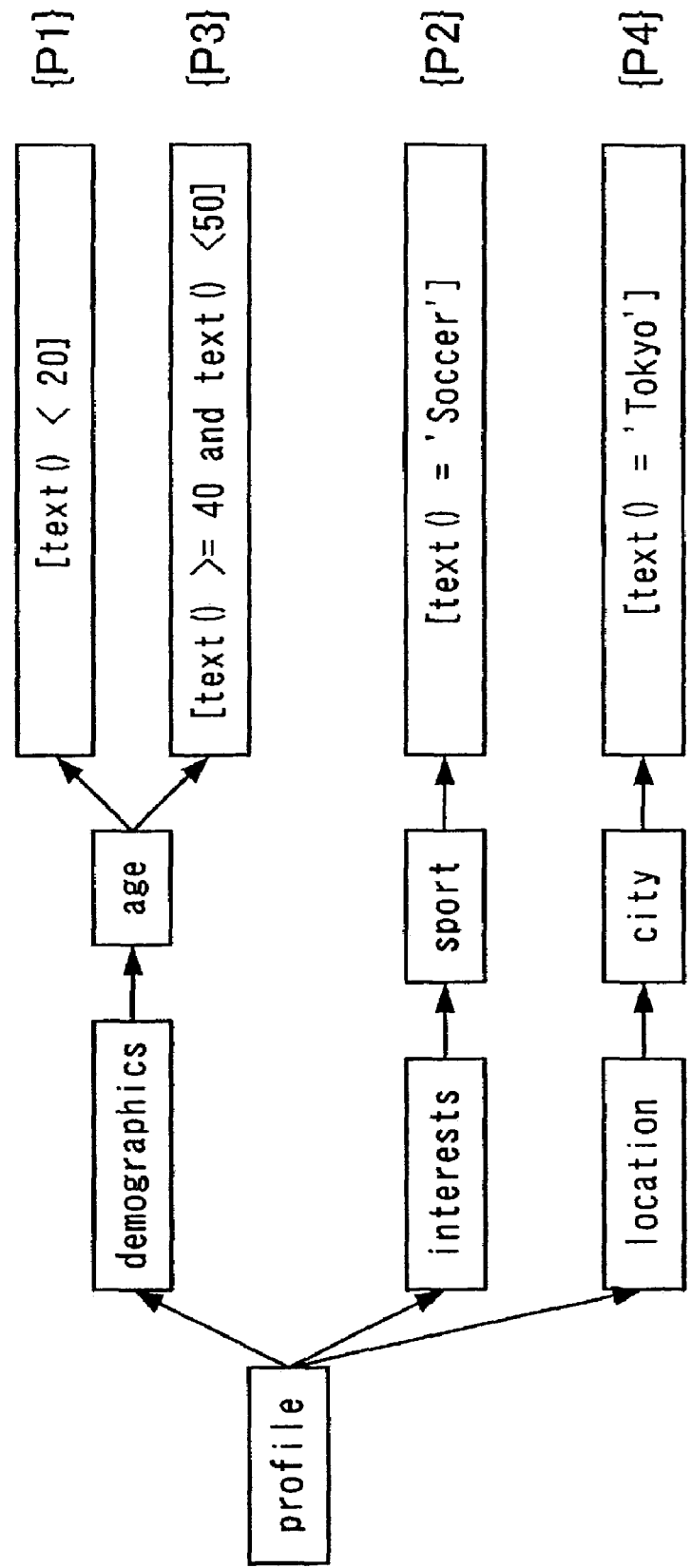

[Figure 10]
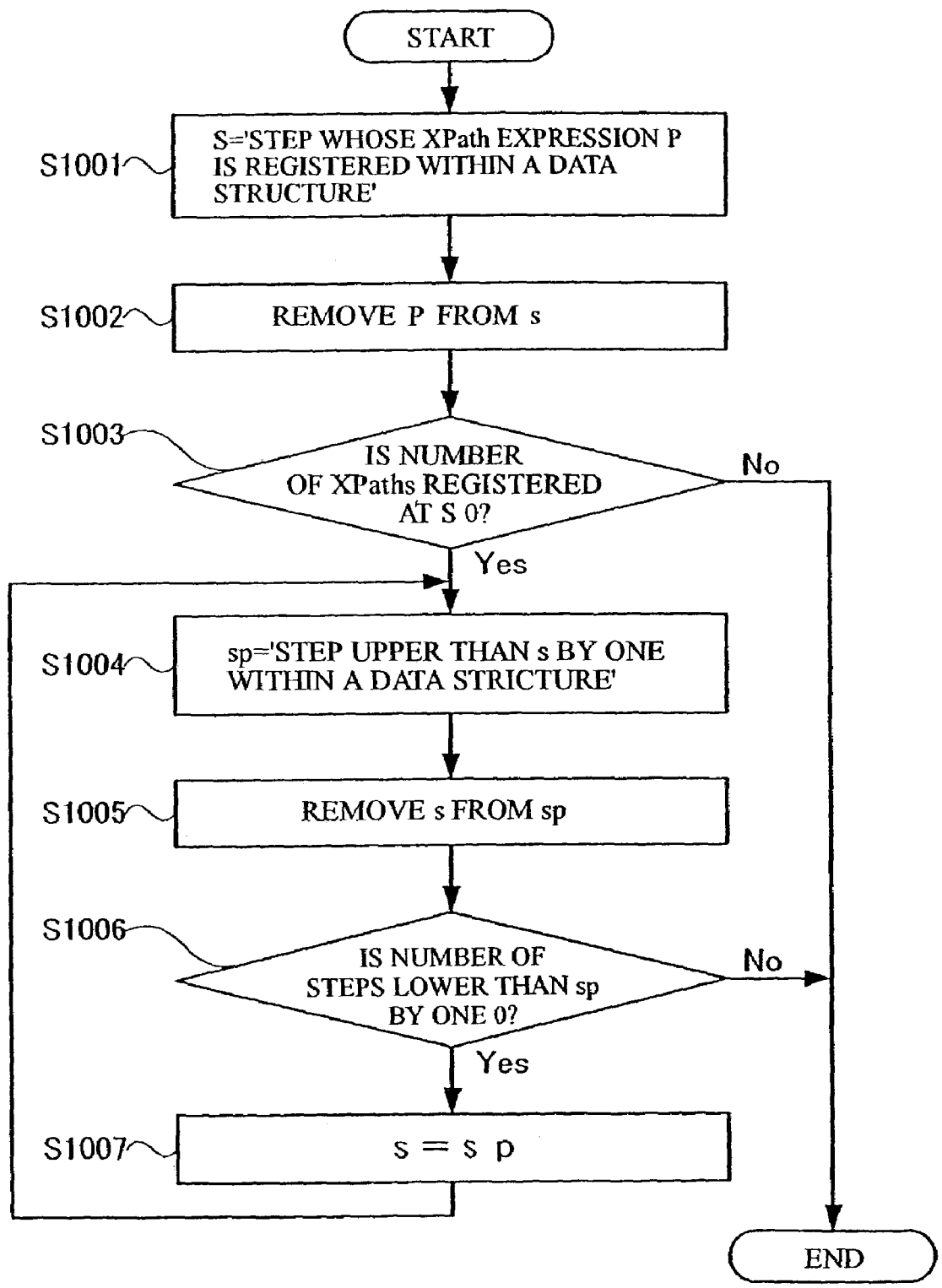

[Figure 11]
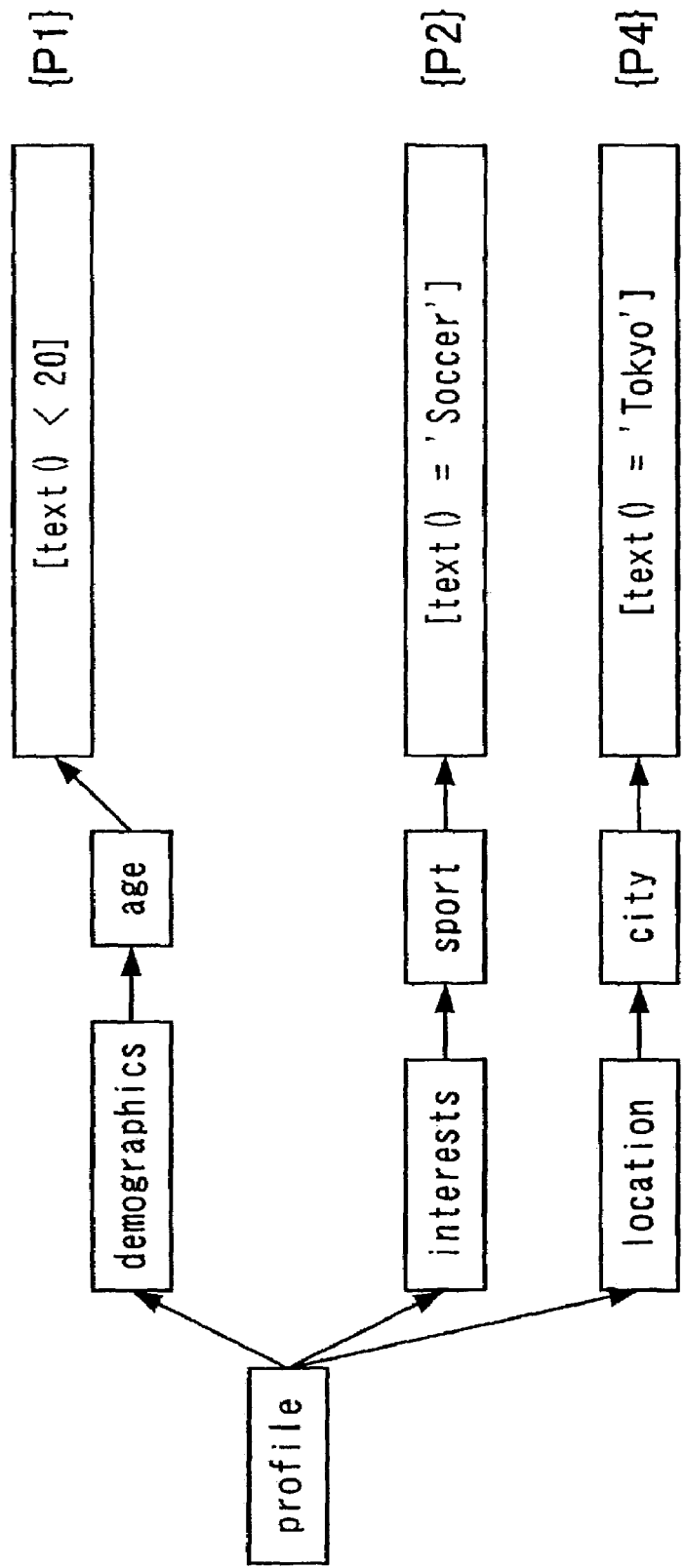

[Figure 12]
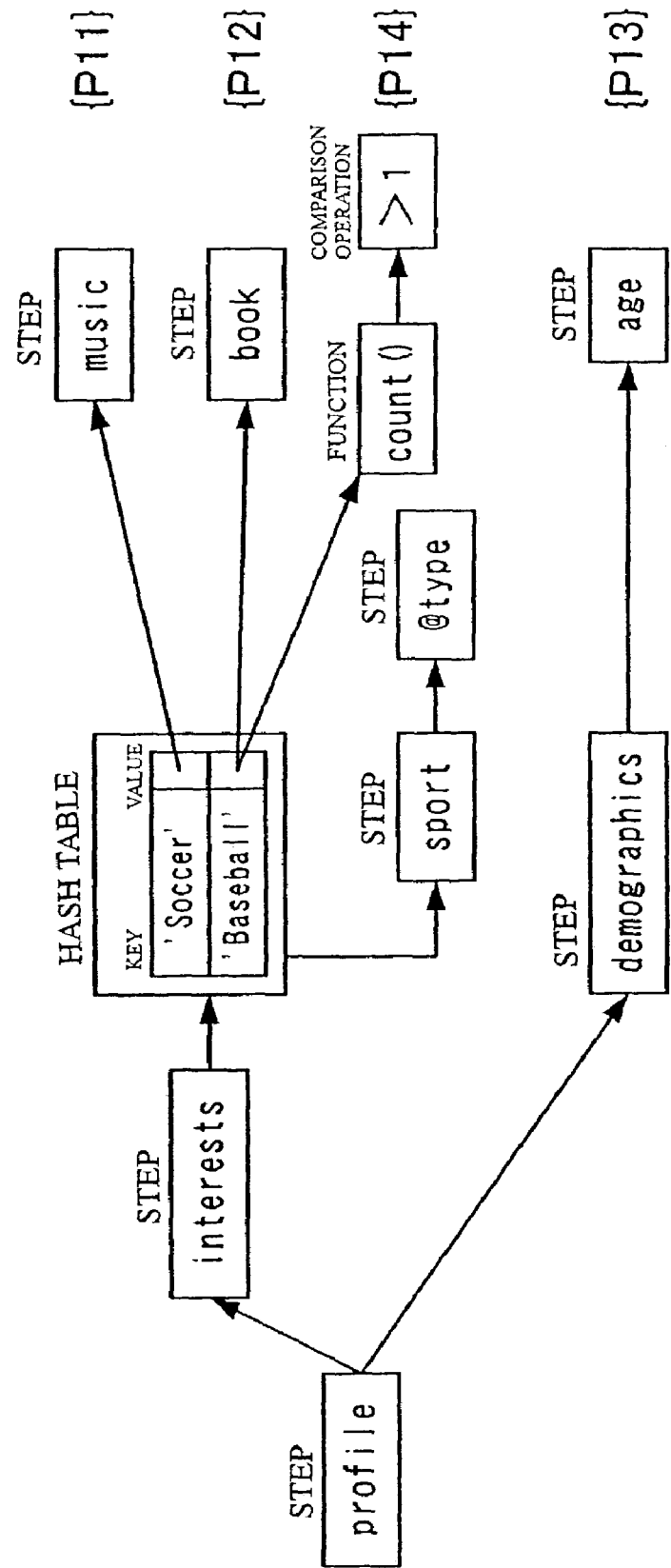

[Figure 13]

```
<profile>
   <demographics>
        <age>19</age>
   </demographics>
   <interests>
        <sport type@='Baseball'/>
        <book>History<book/>
   </interests>
</profile>
```

[Figure 14]
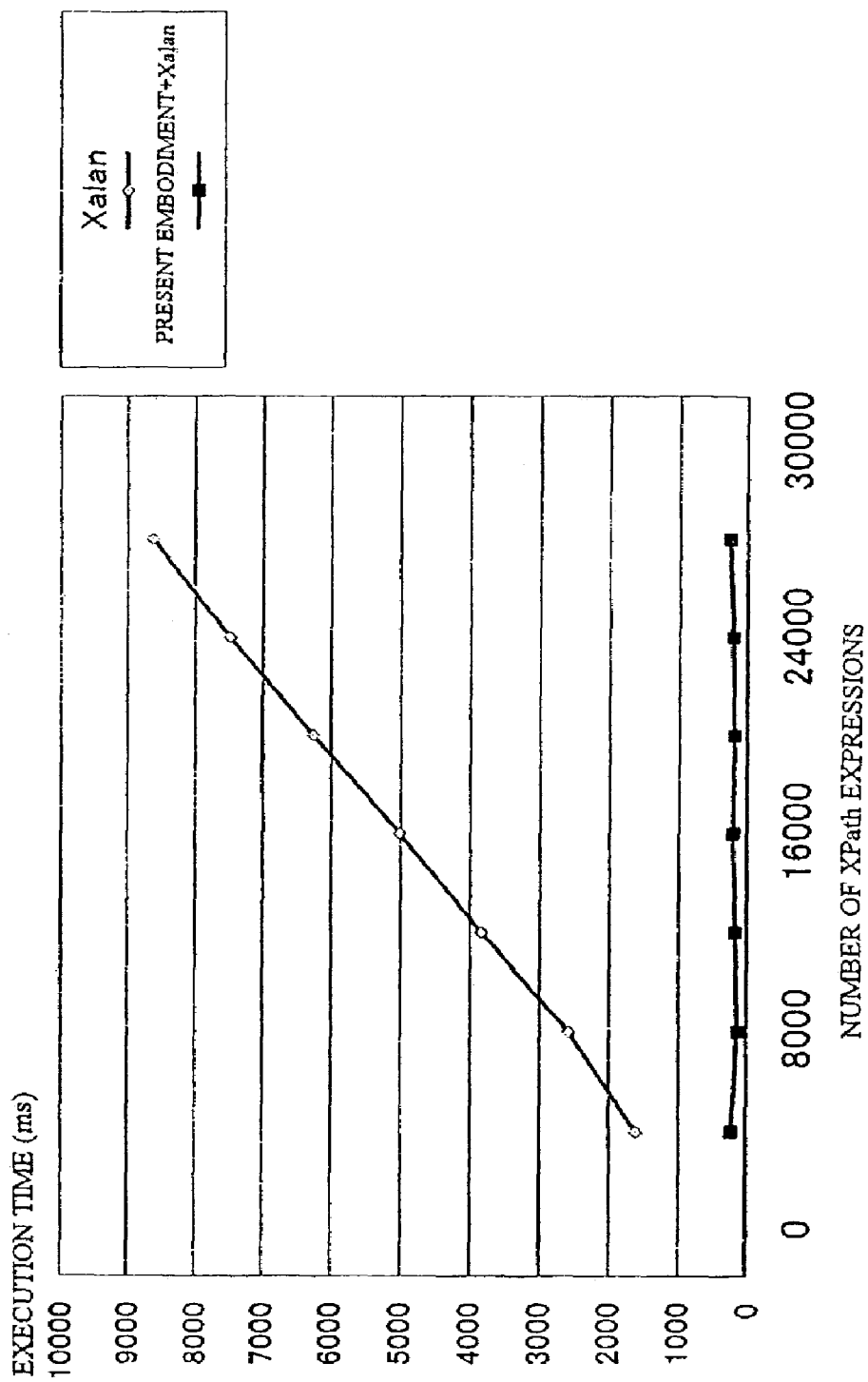

[Figure 15]
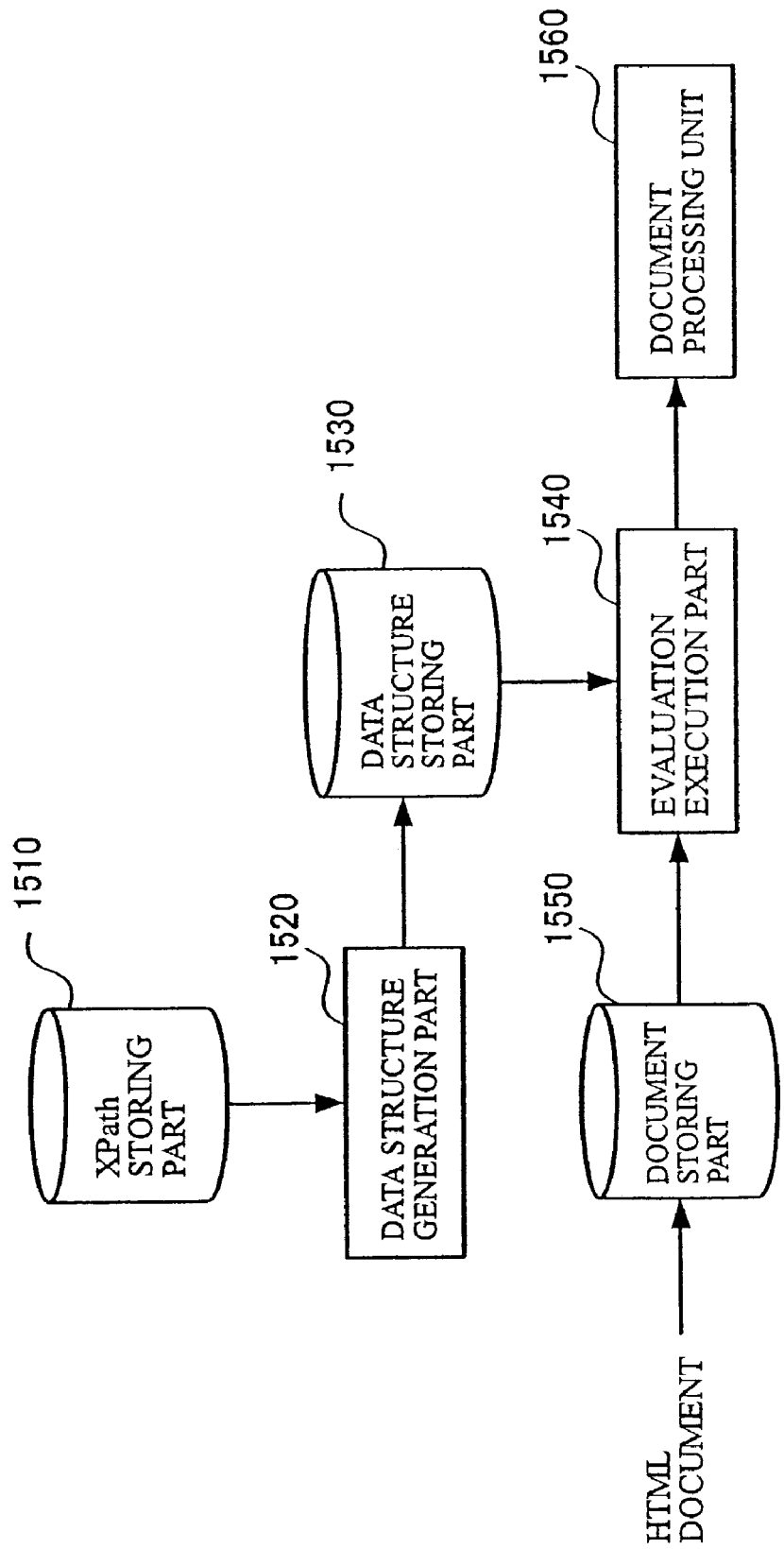

[Figure 16]

| XPath ID | XPath SET | XPath |
|---|---|---|
| 1 | A | /html[1]/body[1]/table[1]/tbody[1]/tr[1]\|/html[1]/body[1]/table[1]/tbody[1]/tr[2] |
| 2 | | /html[1]/body[1]/table[2]/tbody[1]/tr[1]/td[1]/table[1] |
| 3 | | /html[1]/body[1]/table[2]/tbody[1]/tr[1]/td[1]/table[1]/tbody[1]/tr[1]/td[1]/table[1] |
| 4 | | /html[1]/body[1]/table[2]/tbody[1]/tr[1]/td[3] |
| 5 | | /html[1]/body[1]/table[3] |
| 6 | B | /html[1]/body[1]/table[1]/tbody[1]/tr[1]\|/html[1]/body[1]/table[1]/tbody[1]/tr[2] |
| 7 | | /html[1]/body[1]/table[2]/tbody[1]/tr[1]/td[1]/table[1] |
| 8 | | /html[1]/body[1]/table[2]/tbody[1]/tr[1]/td[1]/table[1]/tbody[1]/tr[1]/td[1]/table[1] |
| 9 | | /html[1]/body[1]/table[2]/tbody[1]/tr[1]/td[3]/font[6]\|/html[1]/body[1]/table[2]/tbody[1]/tr[1]/td[3]/table[6]\|/html[1]/body[1]/table[2]/tbody[1]/tr[1]/td[3]/font[7]\|/html[1]/body[1]/table[2]/tbody[1]/tr[1]/td[3]/a[1]\|/html[1]/body[1]/table[2]/tbody[1]/tr[1]/td[3]/font[8] |
| 10 | | /html[1]/body[1]/table[2]/tbody[1]/tr[1]/td[3]/script[1]\|/html[1]/body[1]/table[2]/tbody[1]/tr[1]/td[3]/b[1]\|/html[1]/body[1]/table[2]/tbody[1]/tr[1]/td[3]/br[1]\|/html[1]/body[1]/table[2]/tbody[1]/tr[1]/td[3]/font[1]\|/html[1]/body[1]/table[2]/tbody[1]/tr[1]/td[3]/table[1] |
| 11 | | /html[1]/body[1]/table[2]/tbody[1]/tr[1]/td[3]/table[2]\|/html[1]/body[1]/table[2]/tbody[1]/tr[1]/td[3]/table[3] |
| 12 | | /html[1]/body[1]/table[2]/tbody[1]/tr[1]/td[3]/table[4]\|/html[1]/body[1]/table[2]/tbody[1]/tr[1]/td[3]/table[5] |
| 13 | | /html[1]/body[1]/table[2]/tbody[1]/tr[1]/td[3]/table[7]\|/html[1]/body[1]/table[2]/tbody[1]/tr[1]/td[3]/font[11]\|/html[1]/body[1]/table[2]/tbody[1]/tr[1]/td[3]/a[2]\|/html[1]/body[1]/table[2]/tbody[1]/tr[1]/td[3]/font[12] |
| 14 | | /html[1]/body[1]/table[3] |
| 15 | C | /html[1]/body[1]/table[1]/tbody[1]/tr[1]\|/html[1]/body[1]/table[1]/tbody[1]/tr[2] |
| 16 | | /html[1]/body[1]/table[2]/tbody[1]/tr[1]/td[1]/table[1] |
| 17 | | /html[1]/body[1]/table[2]/tbody[1]/tr[1]/td[1]/table[1]/tbody[1]/tr[1]/td[1]/table[1] |
| 18 | | /html[1]/body[1]/table[2]/tbody[1]/tr[1]/td[3]/table[1] |
| 19 | | /html[1]/body[1]/table[2]/tbody[1]/tr[1]/td[3]/table[2]/tbody[1]/tr[1]/td[1]/table[1] |
| 20 | | /html[1]/body[1]/table[2]/tbody[1]/tr[1]/td[3]/table[2]/tbody[1]/tr[1]/td[1]/table[2] |
| 21 | | /html[1]/body[1]/table[2]/tbody[1]/tr[1]/td[3]/table[2]/tbody[1]/tr[1]/td[3] |
| 22 | | /html[1]/body[1]/table[3] |
| 23 | D | /html[1]/body[1]/table[1]/tbody[1]/tr[1]\|/html[1]/body[1]/table[1]/tbody[1]/tr[2] |
| 24 | | /html[1]/body[1]/table[2]/tbody[1]/tr[1]/td[1]/table[1] |
| 25 | | /html[1]/body[1]/table[2]/tbody[1]/tr[1]/td[1]/table[1]/tbody[1]/tr[1]/td[1]/table[1] |
| 26 | | /html[1]/body[1]/table[2]/tbody[1]/tr[1]/td[3]/table[1] |
| 27 | | /html[1]/body[1]/table[2]/tbody[1]/tr[1]/td[3]/table[2]/tbody[1]/tr[1]/td[1]/table[1]/tbody[1]/tr[1]/td[1]/table[1] |
| 28 | | /html[1]/body[1]/table[2]/tbody[1]/tr[1]/td[3]/table[2]/tbody[1]/tr[1]/td[1]/table[1]/tbody[1]/tr[1]/td[1]/table[2] |
| 29 | | /html[1]/body[1]/table[2]/tbody[1]/tr[1]/td[3]/table[2]/tbody[1]/tr[1]/td[1]/table[1]/tbody[1]/tr[2]\|/html[1]/body[1]/table[2]/tbody[1]/tr[1]/td[3]/table[2]/tbody[1]/tr[1]/td[1]/table[1]/tbody[1]/tr[3]\|/html[1]/body[1]/table[2]/tbody[1]/tr[1]/td[3]/table[2]/tbody[1]/tr[1]/td[1]/table[1]/tbody[1]/tr[4] |
| 30 | | /html[1]/body[1]/table[2]/tbody[1]/tr[1]/td[3]/table[2]/tbody[1]/tr[1]/td[2]/table[1] |
| 31 | | /html[1]/body[1]/table[3] |

[Figure 17]

| XPath ID | XPath |
|---|---|
| X1 | /html[1]/body[1]/table[1]/tbody[1]/tr[1]/html[1]/body[1]/table[1]/tbody[1]/tr[2] |
| X2 | /html[1]/body[1]/table[2]/tbody[1]/tr[1]/td[1]/table[1] |
| X3 | /html[1]/body[1]/table[2]/tbody[1]/tr[1]/td[1]/table[1]/tbody[1]/tr[1]/td[1]/table[1] |
| X4 | /html[1]/body[1]/table[2]/tbody[1]/tr[1]/td[3] |
| X5 | /html[1]/body[1]/table[2]/tbody[1]/tr[1]/td[3]/font[6]/html[1]/body[1]/table[2]/tbody[1]/tr[1]/td[3]/table[6]/html[1]/body[1]/table[2]/tbody[1]/tr[1]/td[3]/font[7]/html[1]/body[1]/table[2]/tbody[1]/tr[1]/td[3]/a[1]/html[1]/body[1]/table[2]/tbody[1]/tr[1]/td[8] |
| X6 | /html[1]/body[1]/table[2]/tbody[1]/tr[1]/td[3]/script[1]/html[1]/body[1]/table[2]/tbody[1]/tr[1]/td[3]/br[1]/html[1]/body[1]/table[2]/tbody[1]/tr[1]/td[3]/b[1]/html[1]/body[1]/table[2]/tbody[1]/tr[1]/td[3]/font[1]/html[1]/body[1]/table[2]/tbody[1]/tr[1]/table[1] |
| X7 | /html[1]/body[1]/table[2]/tbody[1]/tr[1]/td[3]/table[1] |
| X8 | /html[1]/body[1]/table[2]/tbody[1]/tr[1]/td[3]/table[2]/tbody[1]/tr[1]/td[1]/table[1] |
| X9 | /html[1]/body[1]/table[2]/tbody[1]/tr[1]/td[3]/table[2]/tbody[1]/tr[1]/td[1]/table[1]/tbody[1]/tr[1]/td[1]/table[1] |
| X10 | /html[1]/body[1]/table[2]/tbody[1]/tr[1]/td[3]/table[2]/tbody[1]/tr[1]/td[1]/table[1]/tbody[1]/tr[1]/td[1]/table[2] |
| X11 | /html[1]/body[1]/table[2]/tbody[1]/tr[1]/td[3]/table[2]/tbody[1]/tr[1]/td[1]/table[2]/tbody[1]/tr[1]/td[2]/html[1]/body[1]/table[2]/tbody[1]/tr[1]/td[3]/table[3]/html[1]/body[1]/table[2]/tbody[1]/tr[1]/td[3]/tbody[1]/tr[1]/td[3]/tbody[1]/tr[4] |
| X12 | /html[1]/body[1]/table[2]/tbody[1]/tr[1]/td[3]/table[2]/tbody[1]/tr[1]/td[1]/table[2] |
| X13 | /html[1]/body[1]/table[2]/tbody[1]/tr[1]/td[3]/table[2]/tbody[1]/tr[1]/td[2]/table[1] |
| X14 | /html[1]/body[1]/table[2]/tbody[1]/tr[1]/td[3]/table[2]/tbody[1]/tr[1]/td[1]/td[3] |
| X15 | html[1]/body[1]/table[2]/tbody[1]/tr[1]/td[3]/table[4]/html[1]/body[1]/table[2]/tbody[1]/tr[1]/td[3]/table[3] |
| X16 | /html[1]/body[1]/table[2]/tbody[1]/tr[1]/td[3]/table[7]/html[1]/body[1]/table[2]/tbody[1]/tr[1]/td[3]/table[5] |
| X17 | /html[1]/body[1]/table[2]/tbody[1]/tr[1]/td[3]/a[2]/html[1]/body[1]/table[2]/tbody[1]/tr[1]/td[3]/font[11]/html[1]/body[1]/table[2]/tbody[1]/tr[1]/td[3]/font[12] |
| X18 | /html[1]/body[1]/table[3] |

[Figure 18]
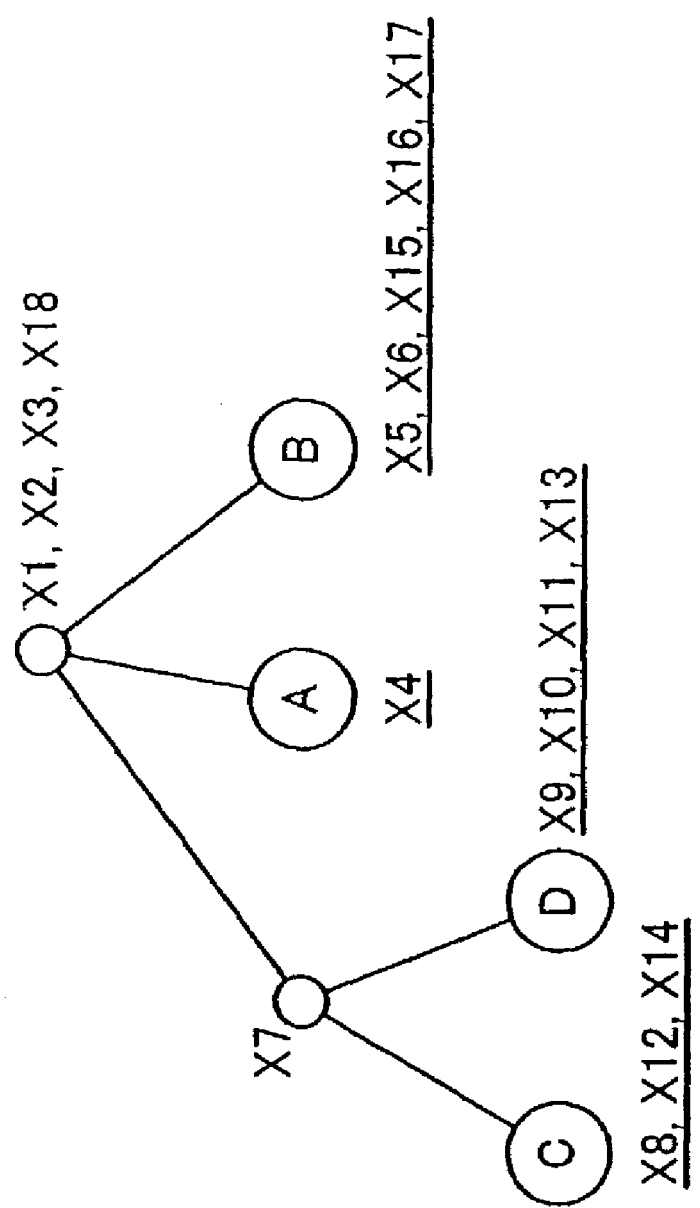

[Figure 19]
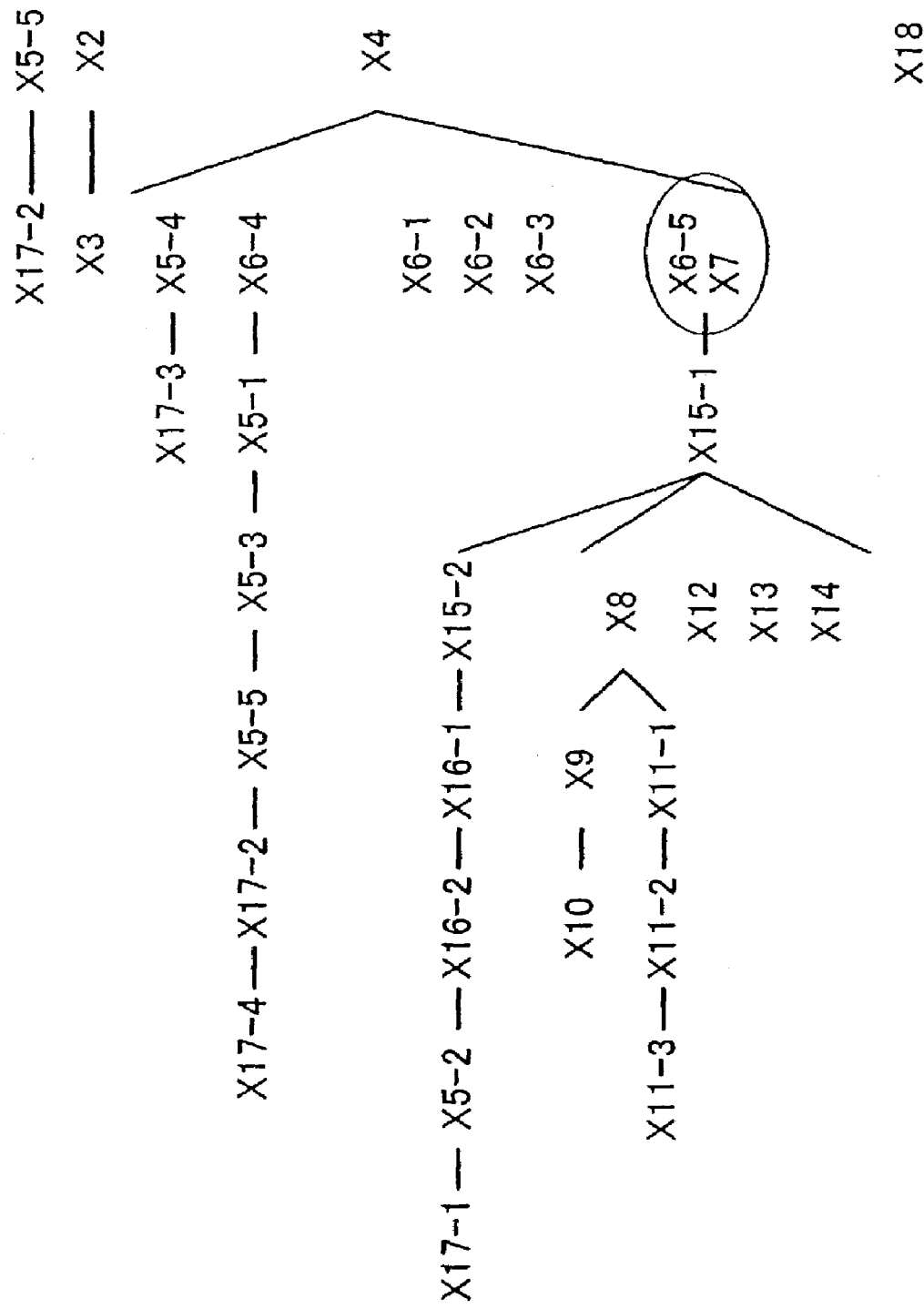

[Figure 20]
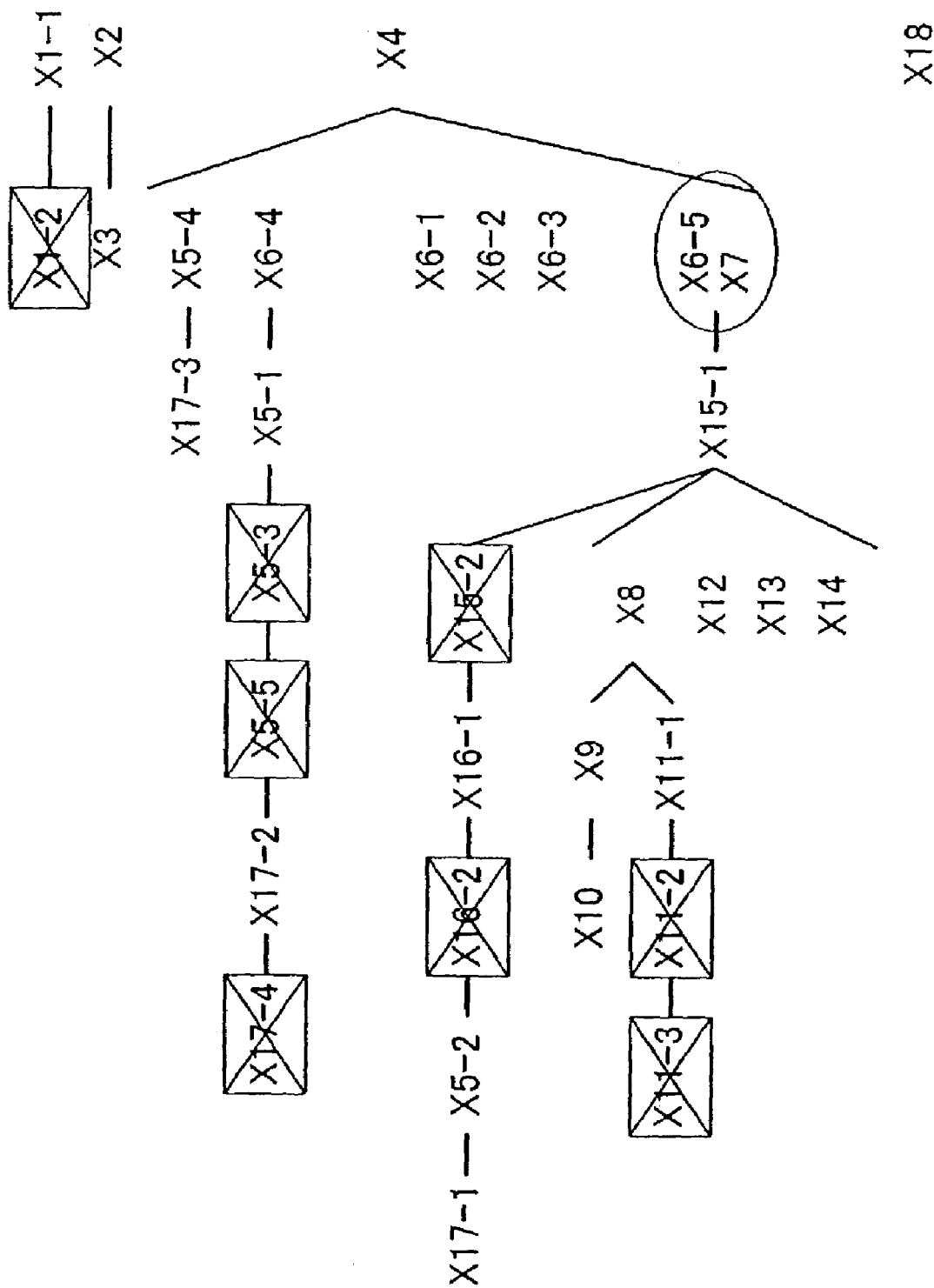

[Figure 21]
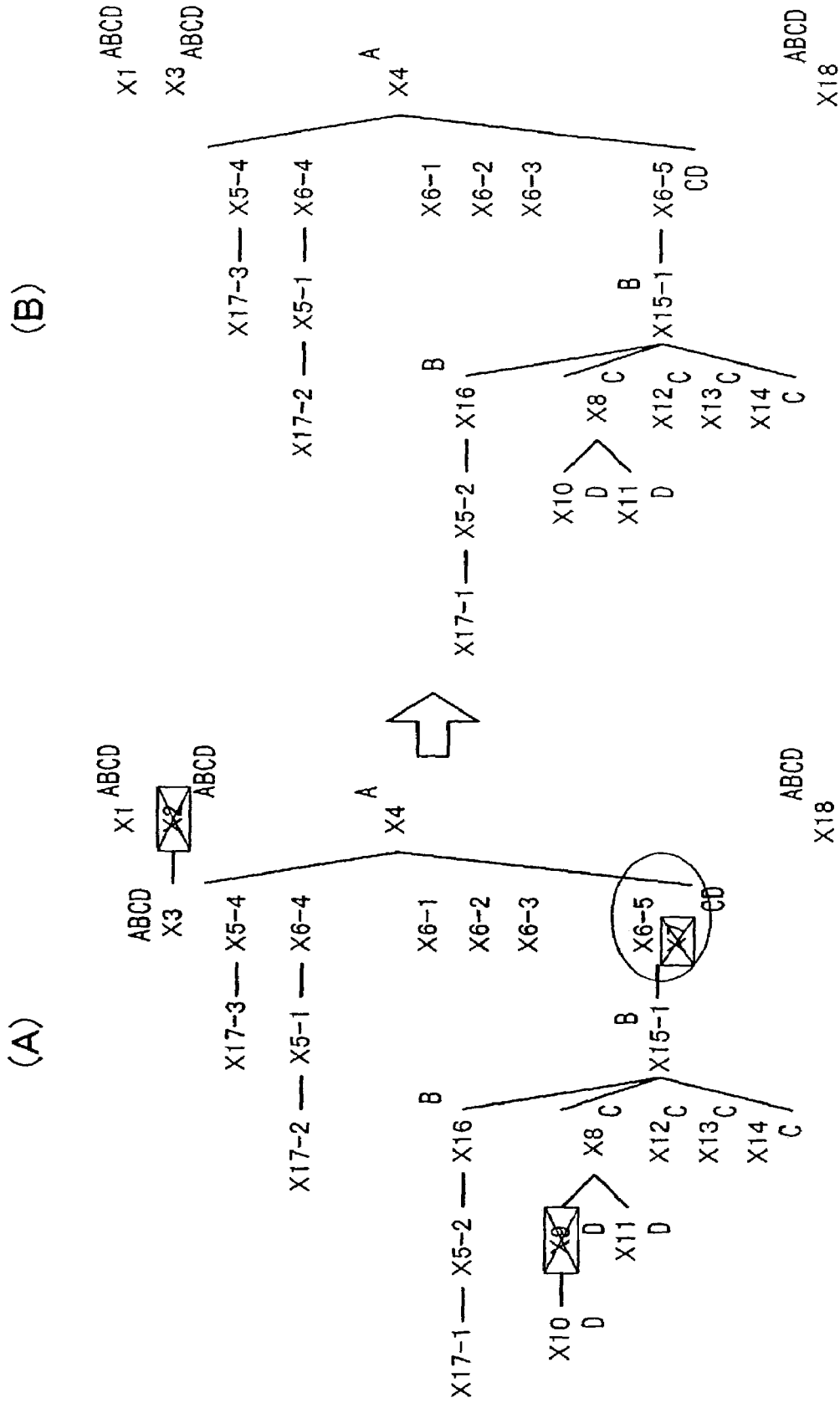

[Figure 22]
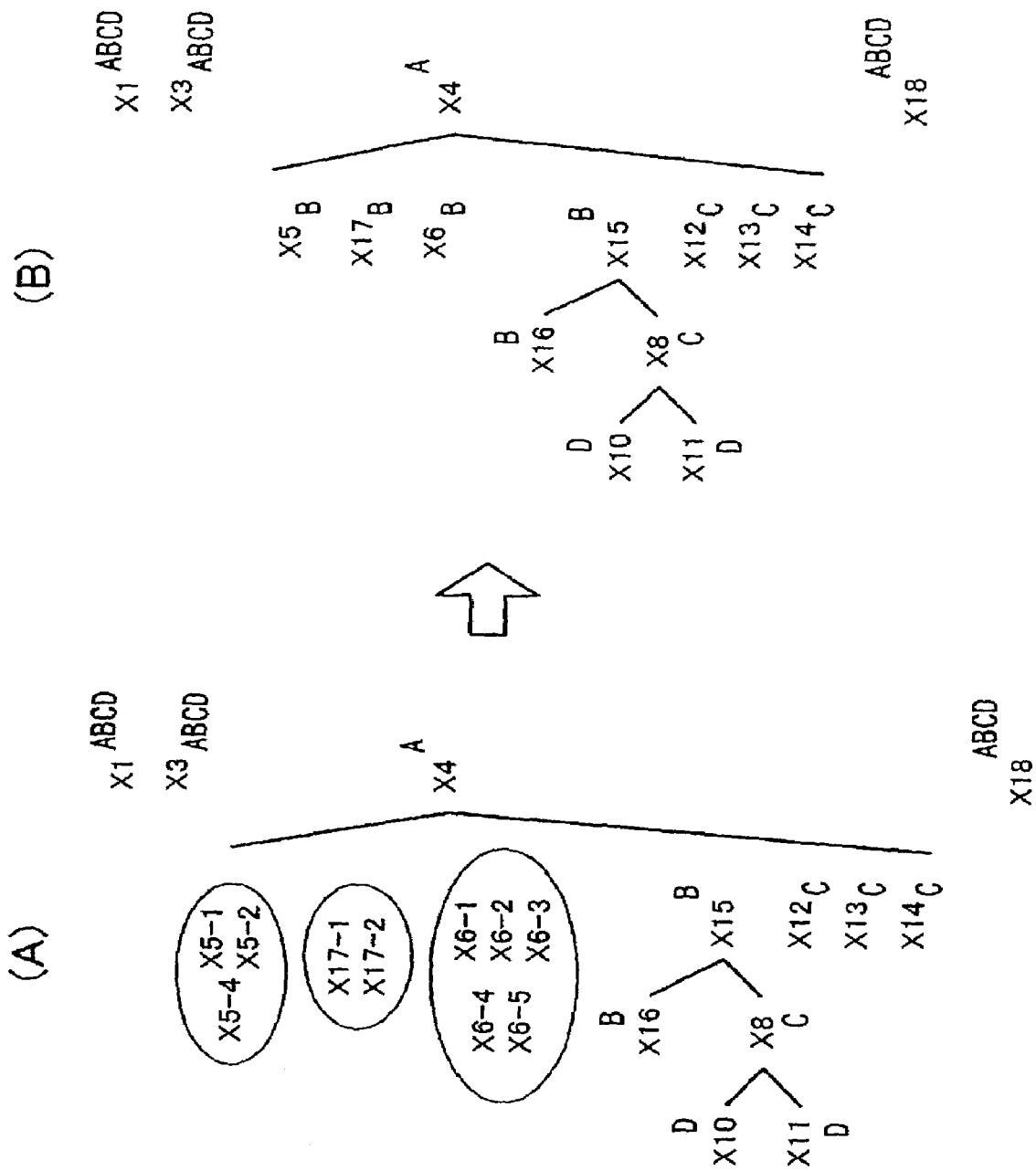

[Figure 23]
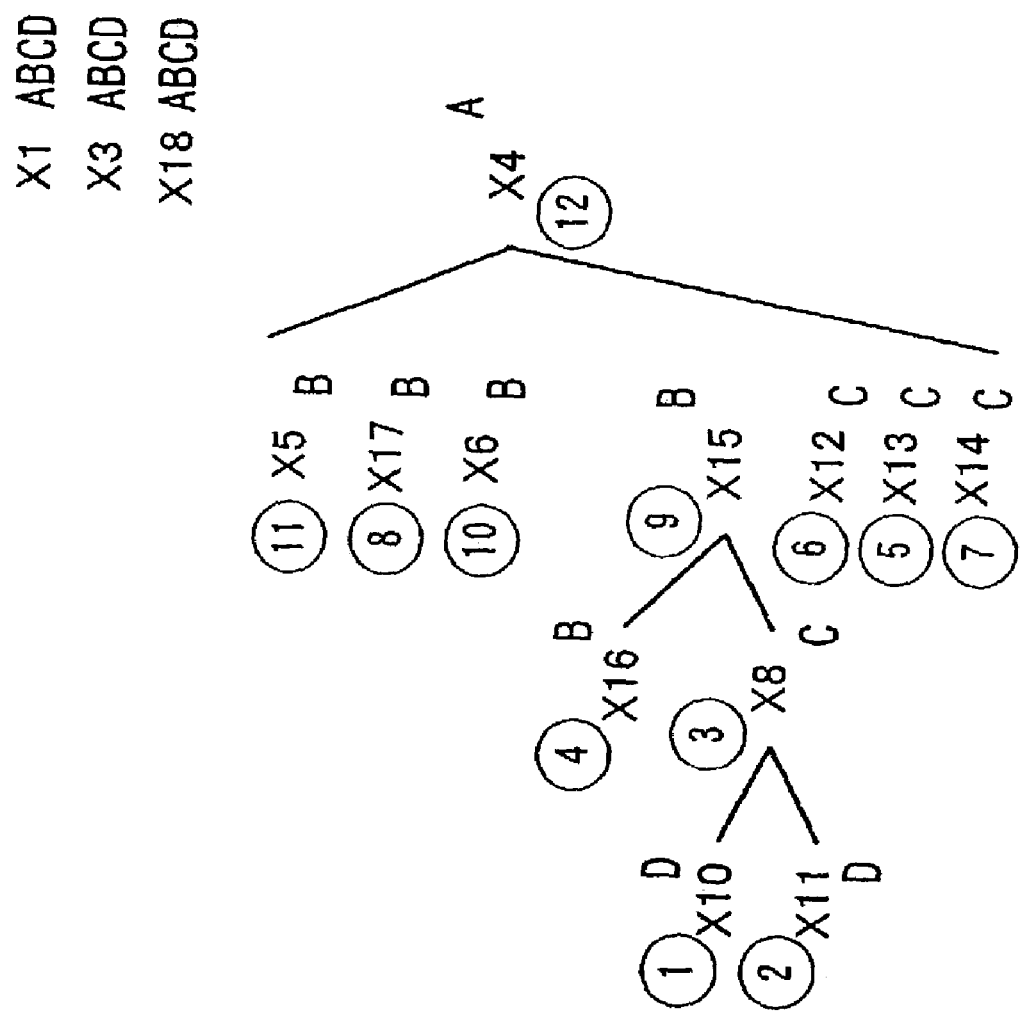

[Figure 24]

| PRIOR-ITIES | XPath ID | DEPEN-DENT XPath | XPath | DEPEN-DENCY LEVEL | TREE LENGTH |
|---|---|---|---|---|---|
| 1 | X10 | X8 | /html[1]/body[1]/table[2]/tbody[1]/tr[1]/td[3]/table[1]/tbody[1]/tr[1]/td[1]/table[2] | 3 | 15 |
| 2 | X11 | X8 | /html[1]/body[1]/table[2]/tbody[1]/tr[1]/td[3]/table[1]/tbody[1]/tr[2] | 3 | 13 |
| 3 | X8 | X4 | /html[1]/body[1]/table[2]/tbody[1]/tr[1]/td[3]/table[2]/tbody[1]/tr[1]/td[1] | 1 | 11 |
| 4 | X16 | X4 | /html[1]/body[1]/table[2]/tbody[1]/tr[1]/td[3]/table[2]/tbody[1]/tr[1]/td[1]/table[2] | 1 | 11 |
| 5 | X13 | X4 | /html[1]/body[1]/table[2]/tbody[1]/tr[1]/td[3]/table[2]/tbody[1]/tr[1]/td[1]/table[1] | 2 | 11 |
| 6 | X12 | X4 | /html[1]/body[1]/table[2]/tbody[1]/tr[1]/td[3]/table[2]/tbody[1]/tr[1]/td[3] | 1 | 10 |
| 7 | X14 |  | /html[1]/body[1]/table[6]/html[1]/html[1]/body[1]/table[2]/tbody[1]/html[1]/td[3]/font[11]/html[1]/body[1]/table[2]/tbody[1]/tr[1]/td[3]/a[2] | 1 | 7 |
| 8 | X17 | X4 | /html[1]/body[1]/table[2]/tbody[1]/tr[1]/td[3]/table[4] | 2 | 7 |
| 9 | X15 | X4 | /html[1]/body[1]/table[2]/tbody[1]/tr[1]/td[3]/table[3] | 1 | 7 |
| 10 | X6 | X4 | /html[1]/body[1]/table[2]/tbody[1]/tr[1]/td[3]/script[1]/html[1]/body[1]/table[2]/tbody[1]/tr[1]/td[3]/b[1]/html[1]/body[1]/table[2]/tbody[1]/tr[1]/td[3]/br[1]/html[1]/body[1]/table[2]/tbody[1]/tr[1]/td[3]/font[6]/html[1]/body[1]/table[2]/tbody[1]/tr[1]/td[3]/table[1] | 1 | 7 |
| 11 | X5 |  | /html[1]/body[1]/table[2]/tbody[1]/tr[1]/td[3]/font[6]/html[1]/body[1]/table[2]/tbody[1]/tr[1]/td[3]/a[1]/html[1]/body[1]/table[2]/tbody[1]/tr[1]/td[3]/font[8] | 1 | 7 |
| 12 | X4 |  | /html[1]/body[1]/table[2]/tbody[1]/tr[1]/td[3] | 0 | 6 |
| NECES-SARY XPart | X1 |  | /html[1]/body[1]/table[1]/tbody[1]/tr[1] | 0 | 5 |
|  | X3 |  | /html[1]/body[1]/table[1]/tbody[1]/tr[1]/td[1]/table[1] | 0 | 11 |
|  | X18 |  | /html[1]/body[1]/table[3] | 0 | 13 |

[Figure 25]

| XPath ID | DEPENDENT XPath | XPath |
|---|---|---|
| PX1 | | [body]/table[2]/tbody[1]/tr[1] |
| PX2 | X8 | {X8}/tbody[1] |
| PX3 | | {X15-1}/tbody[1]/tr[1] |
| X10 | PX2 | {PX2}/tr[1]/td[1]/table[2] |
| X1-1 | | [body]/table[1]/tbody[1]/tr[1] |
| X11-1 | PX2 | {PX2}/tr[2] |
| X12 | PX3 | {PX3}/td[1]/table[2] |
| X13 | PX3 | {PX3}/td[2]/table[1] |
| X14 | PX3 | {PX3}/td[3] |
| X15-1 | X6-5 | {X4}/table[2] |
| X16 | X15-1 | {X4}/table[4] |
| X17-1 | X5-2 | {X4}/table[7] |
| X17-2 | X5-1 | {X4}/font[11] |
| X17-3 | X4 | {X4}/a[2] |
| X18 | | [body]/table[3] |
| X3 | | {PX1}/td[1]/table[1]/tbody[1]/tr[1]/td[1]/table[1] |
| X4 | | {PX1}/td[3] |
| X5-1 | X6-4 | {X4}/font[6] |
| X5-2 | X16 | {X4}/table[6] |
| X5-4 | X4 | {X4}/a[1] |
| X6-1 | X4 | {X4}/script[1] |
| X6-2 | X4 | {X4}/b[1] |
| X6-3 | X4 | {X4}/br[1] |
| X6-4 | X4 | {X4}/font[1] |
| X6-5 | X4 | {X4}/table[1] |
| X8 | PX3 | {PX3}/td[1]/table[1] |

[Figure 26]
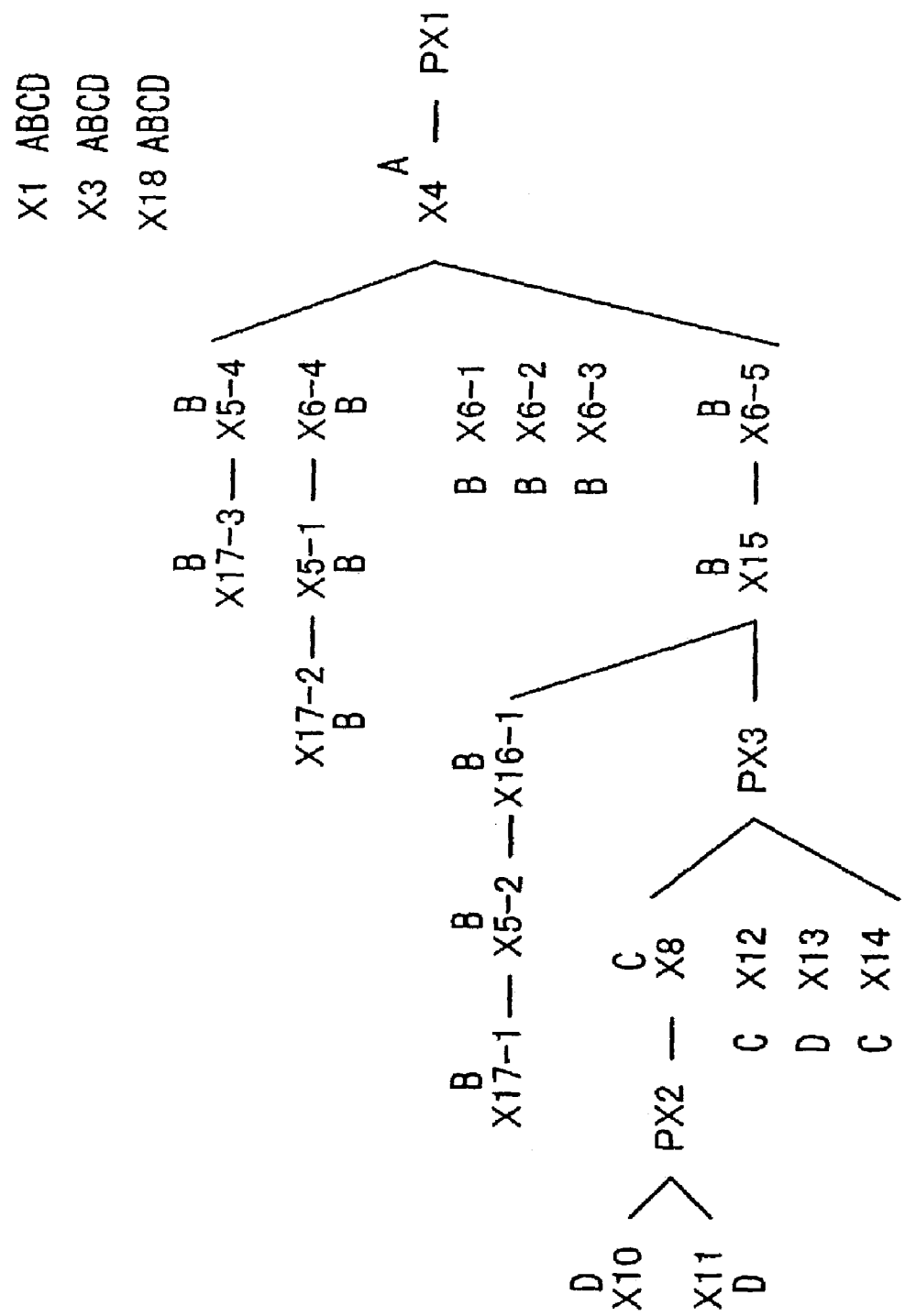

[Figure 27]
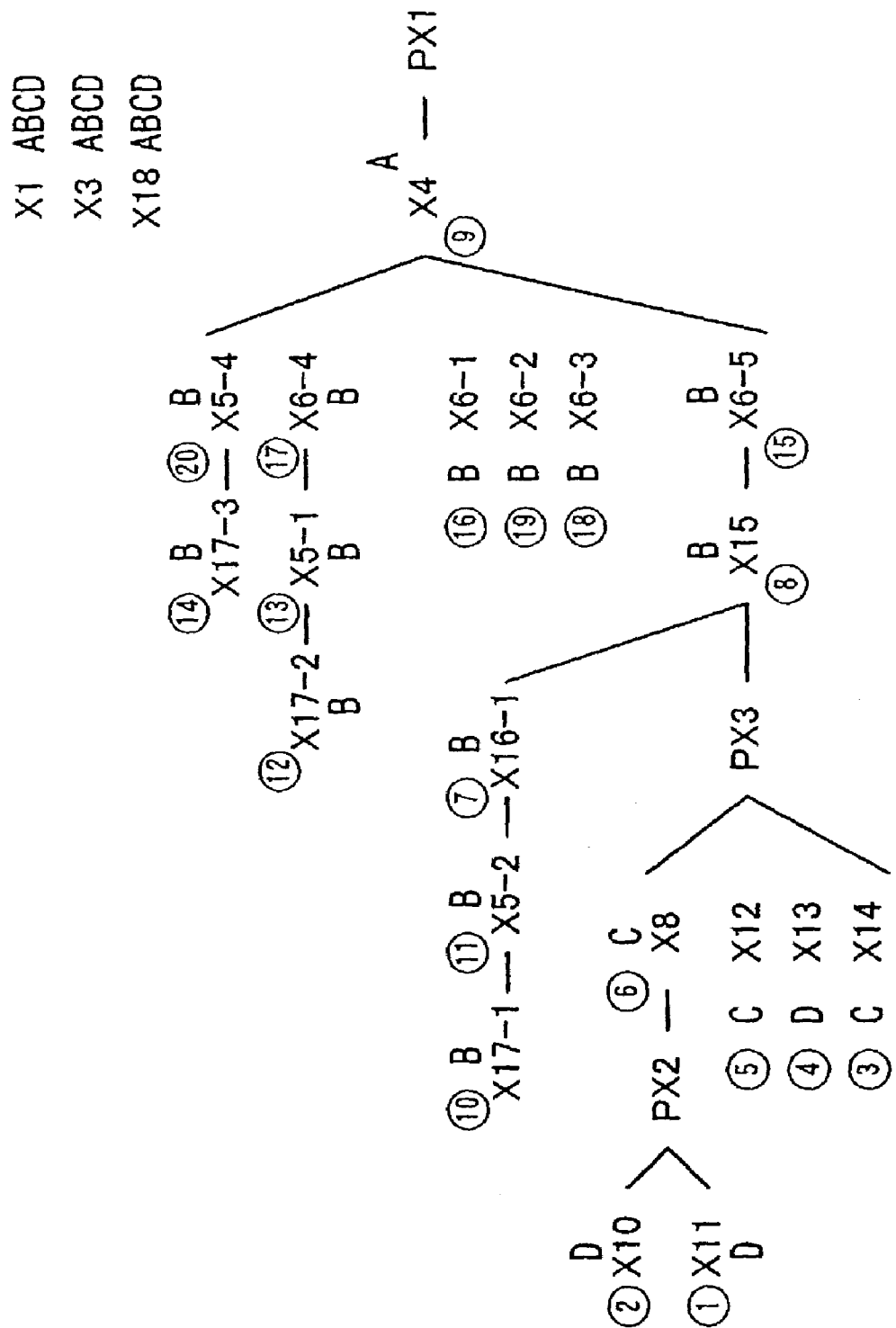

[Figure 28]

| PRIORITIES | XPath ID | DEPENDENT XPath | XPath | DEPENDENCY LEVEL |
|---|---|---|---|---|
| 1 | X11 | PX2 | [PX2]/tr[2] | 7 |
| 2 | X10 | PX2 | [PX2]/tr[1]/td[1]/table[2] | 7 |
| 3 | X14 | PX3 | [PX3]/td[3] | 5 |
| 4 | X13 | PX3 | [PX3]/td[2]/table[1] | 5 |
| 5 | X12 | PX3 | [PX3]/td[1]/table[2] | 5 |
| 6 | X8 | PX3 | [PX3]/td[1]/table[1] | 5 |
| 7 | X16 | X15 | [X4]/table[4] | 4 |
| 8 | X15 | X6-5 | [X4]/table[2] | 3 |
| 9 | X4 | | [PX1]/td[3] | 1 |
| 10 | X17-1 | X5-2 | [X4]/table[7] | 6 |
| 11 | X5-2 | X16 | [X4]/table[6] | 5 |
| 12 | X17-2 | X5-1 | [X4]/font[11] | 4 |
| 13 | X5-1 | X4 | [X4]/font[6] | 3 |
| 14 | X17-3 | X4 | [X4]/a[2] | 3 |
| 15 | X6-5 | X4 | [X4]/table[1] | 2 |
| 16 | X6-1 | X4 | [X4]/script[1] | 2 |
| 17 | X6-4 | X4 | [X4]/font[1] | 2 |
| 18 | X6-3 | X4 | [X4]/br[1] | 2 |
| 19 | X6-2 | X4 | [X4]/b[1] | 2 |
| 20 | X5-4 | X4 | [X4]/a[1] | 2 |
| DIVIDED XPart | PX3 | | [X15-1]/tbody[1]/tr[1] | |
| | PX2 | X8 | [X8]/tbody[1] | |
| | PX1 | | [body]/table[2]/tbody[1]/tr[1] | |
| NECESSARY XPart | X1 | | [body]/table[1]/tbody[1]/tr[1] | |
| | X18 | | [body]/table[3] | |
| | X3 | | [PX1]/td[1]/table[1]/tbody[1]/tr[1]/td[1]/table[1] | |

[Figure 29]

XPATH EVALUATION METHOD, XML DOCUMENT PROCESSING SYSTEM AND PROGRAM USING THE SAME

BACKGROUND OF THE INVENTION

1. Field of the Invention

The present invention relates to a technique for efficiently evaluating XPath expressions to specify a certain part of XLM or HTML documents using XPaths (XML Path Language).

2. Related Art

W3C (World Wide Web Consortium) released 'XPath' as a recommendation for a path language to specify a certain part of an XML document. XPaths are used as a component of XPointer, XSLT, XQuery, etc., and also used to access a DOM (Document Object Model) tree for an XML document in a predetermined application program.

Evaluating a plurality of XPaths with respect to a single XML document is commonplace in actual information processing with an XML document. In an XSLT style sheet, for example, an XPath expression is specified as a pattern for each template rule. Therefore, a complex XSLT style sheet includes a number of XPath expressions, which need to be evaluated with respect to an XML document to be an objective of processing.

In addition, it is broadly known that a predetermined web page can be reused in various ways and a new application can be developed by adding an annotation to a web page to be used for such purpose as exchanging data on Internet. An XPath is also used for associating an annotation with an element of a web page, because an HTML document used for writing a web page can specify a certain part by using an XPath expression in the same way as an XML document does. An efficient way to add an annotation to a web page is applying a particular annotation to a plurality of web pages for recycling. In this case, it requires to evaluate whether a plurality of XPath expressions in a predetermined annotation correctly specify a predetermined element in a targeted web page or not in order to determine whether the predetermined annotation is applicable to the predetermined web page or not.

A feature of specifying a certain part of an XML document with an XPath is considered to be a condition for checking whether an XML document to be an objective for processing has a certain part specified by an XPath or not. For example, WebLogic Collaborate (http://www.bea.com/index.html), a server system from U.S. BEA uses XPaths to write a condition for routing and filtering of a message expressed in XML. For such a purpose, a plurality of XPath expressions should be evaluated for each time a XML document arrives.

When a plurality of XPath expressions need to be evaluated for each XML document like in the above-mentioned case, an efficient way of evaluating XPath expressions is required. A conventional kind of such technique is performed by writing a condition of subscription for each user with respect to a document written in XML with XPaths, checking the XML document with respect to matching with XPath expressions for each time the document arrives, and then delivering a document that passed the check to a user with a condition of subscription for XPaths (for example, see non-patent-related document 1). This method for evaluating an XPath expression improves an execution time per XPath by evaluating for each step of a location path via searching a table.

Altinel M., Franklin, M., "Efficient Filtering of XML Documents for Selective Dissemination of Information", International Conference on Very Large Data Bases, 2000.

As mentioned above, when a plurality of XPath expressions are evaluated for a single data file (document) in processing with respect to XML or HTML documents, an efficient way to evaluate XPath expressions is needed.

However, although methods for improving an execution time of an evaluation per XPath as the method disclosed in the above-mentioned document have been known, an execution time required for the entire evaluation linearly increases in proportion to the growth of the number of XPath expressions, which limits shortening of the entire execution time.

This is caused by the fact that conventional evaluation methods for an XPath handle respective XPath expressions independently of each other in evaluating a plurality of XPath expressions.

For a plurality of XPath expressions assumed to be evaluated for a single data file, the expressions are limited with a variation of structures or element values of an objective data file and the like. As a result, the plurality of XPath expressions include similar expressions. Therefore, by retrieving and evaluating a common part from similar XPath expressions and sharing an evaluation result for the common part among the similar XPath expressions, an evaluation of XPaths can be performed quicker than in a way of evaluating a plurality of XPath expressions respectively.

Where a plurality of XPath expressions to be evaluated depend on each other, processing required for an evaluation of XPath expressions can be simplified by taking advantage of the dependency. Dependency among XPath expressions in this context refers to; when a web page specified by a predetermined XPath expression includes two table contents (table [1], table [2]), for example, a relation where table [2] does not exist if table [1] does not exist, i.e., a relation where an evaluation of one or a part of a plurality of XPaths tells evaluation results for remaining XPaths.

SUMMARY OF THE INVENTION

Therefore, the present invention is intended to provide a method for obtaining an evaluation result in an efficient manner for a plurality of XPath expressions by taking advantage of the above-mentioned similarity or dependency among XPath expressions in evaluating a plurality of XPath expressions with respect to a data file such as an XML or HTML document.

The present invention to accomplish the above-mentioned object is implemented as a following XPath evaluation method for evaluating a plurality of XPaths with respect to a predetermined data file by a computer. In other words, this XPath evaluation method is characterized by including the steps of generating a data structure that has a common part of a plurality of XPath expressions to be evaluated as a common node in a tree structure, evaluating the generated data structure in node-by-node basis with respect to a data file to be an objective of processing, and obtaining an evaluation result for each XPath expression by combining the evaluation results for each of the nodes.

The above-mentioned step of generating a data structure specifically includes the steps of decomposing individual XPath expressions into steps, and associating a node with each step obtained from the decomposition and generating a data structure, in which a step common to a plurality of XPath expressions is associated with a single node.

More preferably, the step of generating a data structure can use a special data structure when a plurality of steps of XPath expressions are written in a common particular form, more specifically, when a predicate in the form of '[(expression)(comparison operator)(constant)]' exists. For example, when a comparison operator is '=' or '!=', a hash table for searching for remaining steps in an XPath can be generated by using an evaluation result for a predicate expression in a step as a key to evaluate the remaining steps in the XPath obtained from a search by means of the generated hash table. Or, when a comparison operator is '>', '>=', '<' or '<=', a binary search tree for searching for remaining steps in an XPath can be generated by using an evaluation result for a predicate expression in a step as a key to evaluate the remaining steps in the XPath obtained from a search by means of the generated binary search tree.

Moreover, the step of generating a data structure includes the steps of decomposing an operation expression or function into subexpressions when a plurality of XPath expressions include an operation expression or function, and generating a non-repeating directed graph by combining common subexpressions of the subexpressions obtained from decomposition. And the step of evaluating an XPath expression includes the step of evaluating each XPath expression by using the generated non-repeating directed graph and sharing an evaluation result among a plurality of XPath expressions for a subexpression common to a plurality of XPath expressions.

Then, for individual subexpressions, a data structure that has a common part as a common node in a tree structure can be generated as mentioned above, and the data structure can be used to perform an evaluation.

Another XPath evaluation method according to the present invention is characterized by including the steps of extracting a common part from a plurality of XPath expressions to be evaluated, and obtaining an evaluation result for each XPath expression, with respect to a data file to be an objective of processing, by evaluating the common part and the other parts in the XPath expression separately and combining the evaluation results, wherein the step of obtaining an evaluation of an XPath expression includes a step of using an evaluation result obtained at an evaluation of another XPath as an evaluation result for a common part of a predetermined XPath expression if such an evaluation result exists, with respect to the common part when evaluating the predetermined XPath expression.

Yet another XPath evaluation method according to the present invention is characterized by including a step of reading out an XPath set including a plurality of XPath expressions to be evaluated from a memory and generating a data structure with a redundant element in the XPath expressions included in the XPath set omitted, and a step of inputting a data file to be an objective of processing, evaluating the XPath set by using the data structure with respect to the data file, and storing the obtained evaluation result into a memory, in an XPath evaluation method for evaluating a plurality of XPaths with respect to a predetermined data file by a computer.

More specifically, in the step of generating a data structure, an XPath expression commonly included in a plurality of XPath sets and an XPath expression unique to a predetermined XPath set are separated, and XPath expressions to be evaluated at an evaluation of the XPath sets are narrowed down. Further, a connected XPath expression included in the XPath set is simplified by removing an XPath expression that can dispense with an evaluation from objectives of evaluation on the basis of dependency among respective XPaths constituting the connected XPath expression. Yet further, an XPath expression that can dispense with an evaluation is removed from objectives of evaluation on the basis of dependency among a plurality of XPath expressions. And further, a part common to a plurality of XPath expressions and a part unique to each XPath expression are separated to make each part an objective of evaluation as an individual XPath expression.

Additionally, for an evaluation of an XPath set, an XPath expression unique to each XPath set is initially evaluated, and if each of the unique XPath expressions matches a data file to be an objective of processing, XPath expressions common to the remaining XPath sets within the XPath sets are evaluated.

The present invention to accomplish the above-mentioned object is also implemented as a document processing system configured in the following way. The document processing system is characterized by including an XPath storing part which stores a plurality of XPath expressions, a data structure-generation part for generating a data structure with redundant elements of a plurality of XPath expressions stored in the XPath-storing part being omitted, and an evaluation execution part for evaluating the plurality of XPath expressions with respect to a data file to be evaluated by using the data structure generated at the data structure-generation part.

Further, the document processing system can be configured to include a data structure-storing part for storing and retaining a data structure generated at the data structure-generation part. In this case, the evaluation execution part can evaluate an XPath expression with respect to a plurality of data files by repeatedly using a data structure stored in the data structure-storing part.

Specifically, the data structure-generation part includes a step decomposing means for decomposing individual XPath expressions into steps and a tree generation means for generating a data structure, in which a step common to a plurality of XPath expressions is associated with a node by associating a node with each step obtained from the decomposition.

If an XPath expression stored in the XPath storing part is changed, the data structure generation part generates a new node for a part which does not have a node corresponding to the data structure in newly added XPath expressions and adds the new node to an existing data structure. On the other hand, a data structure is updated by removing only a node corresponding to a part unique to the XPath expression from nodes corresponding to a part of deleted XPath expressions.

Further, the data structure generation part removes an XPath expression which overlaps other XPath expressions or an XPath expression whose evaluation result depends on other XPath expressions from objectives of evaluation.

Yet further, the evaluation execution part evaluates a part corresponding to each node in the data structure, obtains a general evaluation result for individual XPath expressions by combining the partial evaluation results, and shares an evaluation result for a part corresponding to a node common to a plurality of XPath expressions in evaluating a plurality of XPath expressions.

The present invention to accomplish the above-mentioned object is also embodied as a program causing a computer to execute processing corresponding to each step of the above-mentioned XPath evaluation method, or controlling a computer to execute each function as the above-mentioned document processing system. The program can be provided by storing and distributing on a magnetic disk, an optical disk, a semiconductor memory or other storage medium, or by delivering over a network.

BRIEF DESCRIPTION OF THE DRAWINGS

FIG. 1 is a diagram schematically illustrating an exemplary configuration of hardware in a computer system which is preferable for implementing an XML document processing system according to the first embodiment;

FIG. 2 is a diagram illustrating a function of an XML document processing system according to the first embodiment;

FIG. 3 is a diagram illustrating a data structure generated at a data structure generation part of the first embodiment;

FIG. 4 is a diagram illustrating an exemplary XML document to be an objective of processing of the first embodiment;

FIG. 5 is a flow chart illustrating a processing procedure by an evaluation execution part in evaluating a plurality of XPath expressions in width priority;

FIG. 6 is a diagram illustrating a non-repeating directed graph representing XPath expressions P7, P8 and P9 to be evaluated in the first embodiment;

FIG. 7 is a flow chart illustrating a flow of evaluation processing using a hash table in the first embodiment;

FIG. 8 is a flow chart illustrating a method for generating a data structure with a data structure generation part of the first embodiment;

FIG. 9 is a diagram illustrating a data structure with an XPath expression P4 being added to the data structure of FIG. 3;

FIG. 10 is a flow chart illustrating processing of a data structure generation part at removal of a predetermined XPath expression from a data structure;

FIG. 11 is a diagram illustrating a data structure with an XPath expression P3 being removed from a data structure shown in FIG. 9;

FIG. 12 is a diagram illustrating a data structure representing XPath expressions P11, P12, P13, and P14;

FIG. 13 is a diagram showing an XML document to be an objective of processing;

FIG. 14 is a diagram illustrating an execution time taken for evaluating an XPath expression according to the embodiment;

FIG. 15 is a block diagram illustrating a function of a web page processing system according to the second embodiment;

FIG. 16 is a table listing XPath sets and XPath expressions included therein;

FIG. 17 is a diagram listing XPath expressions shown in FIG. 16 with redundancy got rid of and identifying information (XPath ID) assigned;

FIG. 18 is a diagram illustrating XPath expressions shown in FIG. 17 with extracted of XPath expressions common to a plurality of XPath sets in a graph structure;

FIG. 19 is a diagram illustrating dependency among XPath expressions after broken a connected XPath expression in a tree structure;

FIG. 20 is a diagram illustrating a connected XPath expression simplified on the basis of dependency among XPath expressions shown in FIG. 19;

FIG. 21 is a diagram of XPath expressions omitted on the basis of dependency among XPath expressions shown in FIG. 20;

FIG. 22 is a diagram illustrating the case that recombination is executed for what can be recombined with respect to an XPath expression in the dependency tree of XPath expressions shown in FIG. 21;

FIG. 23 is a diagram illustrating each node (an XPath expression) in the dependency tree shown in FIG. 22 added with priorities (the number in a circle);

FIG. 24 is a table listing XPath expressions on the basis of the priorities shown in FIG. 23;

FIG. 25 is a table showing a list of XPath expressions obtained through the separation processing after simplification and omitting on the basis of dependency;

FIG. 26 is a diagram illustrating a dependency tree including PX1, PX2, and PX3 shown in FIG. 25;

FIG. 27 is a diagram illustrating each node of the dependency tree shown in FIG. 26 (XPath expression) added with priorities according to the above rule;

FIG. 28 is a table listing XPath expressions according to the priorities shown in FIG. 27; and FIG. 29 is a diagram illustrating a structure of an XPath expression which can be optimized according to the second embodiment.

DESCRIPTION OF THE PREFERRED EMBODIMENTS

The present invention will now be specifically described on the basis of embodiments shown in accompanying drawings.

The embodiments is intended for data files with a predetermined part can be specified by an XPath, such as an XML document or an HTML document, which is used for writing a web page. Accordingly, descriptions intended for XML documents can be applied to HTML documents and vise versa.

First Embodiment

FIG. 1 is a diagram illustrating an exemplary configuration of hardware in a computer system which is preferable for implementing an XML document processing system according to the first embodiment.

A computer system shown in FIG. 1 includes a CPU (Central Processing Unit) 101 of a computing means, a main memory 103 connected to a CPU 101 via a M/B (mother board) chipset 102 and a CPU bus, a video card 104 connected to a CPU 101 also via a M/B chipset 102 and AGP (Accelerated Graphics Port), a display device 110 for displaying graphic data generated with a video card 104, a harddisk 105 and a network interface 106 connected to a M/B chipset 102 via a PCI (Peripheral Component Interconnect) bus, and a floppy disk drive 108 and a keyboard/mouse 109 connected from the PCI bus to a M/B chipset 102 via a slower bus such as a bridge circuit 107 and an ISA (Industry Standard Architecture) bus. For a display device 110, a liquid crystal display (LCD) or CRT display, for example, can be used.

FIG. 1 is a merely example of a hardware configuration of a computer system for implementing the embodiment, and other different configurations can be adopted where the embodiment can be applied. For example, a configuration for processing image data at a CPU 101 with mounting only a video memory is possible instead of providing a video card 104, a sound feature can be provided to input and output with sound, or a drive for a CD-ROM (Compact Disk Read Only Memory) or a DVD-ROM (Digital Versatile Disk Read Only Memory) can be provided via an interface such as ATA (AT Attachment).

FIG. 2 is a block diagram illustrating a feature of an XML document processing system according to the first embodiment.

Referring to FIG. 2, the embodiment includes an XPath storing part 10 that stores a plurality of XPaths specifying a particular part of an XML document to be an objective of processing, a data structure generation part 20 for generating a data structure to evaluate efficiently according to the embodiment from an XPath expression stored in the XPath storing part 10, a data structure storing part 30 for storing a data structure generated at the data structure generation part 20, and an evaluation execution part 40 for evaluating an XPath expression for an XML document to be an objective of processing by using a data structure stored in the data structure storing part 30, as well as an XML document storing part 50 for storing an XML document to be an objective of processing and an XML document processing unit 60 for executing predetermined information processing with respect to an XML document, which has been subjected to an evaluation by an evaluation execution part 40.

In the system configuration illustrated in FIG. 2, a data structure generation part 20, an evaluation execution part 40 and an XML document processing unit 60 are virtual software blocks embodied at a CPU 101 controlled by a program shown in FIG. 1. A Program controlling a CPU 101 to implement each of these functions is provided and read in a main memory 103 by stored and distributed on a magnetic disk, an optical disk, a semiconductor memory or other storage media, or by delivered over a network. An XPath storing part 10, a data structure storing part 30 and an XML document storing part 50 are embodied at a main memory 103. Data and programs held at a main memory 103 can be saved on a storage device such as a harddisk 105 as required.

In a system configuration shown in FIG. 2, an XPath storing part 10 stores a previously provided plurality of XPath expressions to be evaluated with respect to an XML document. A data structure-storing part 30 stores a data structure generated at a data structure generation part 20 to be used at an evaluation execution part 40. An XML document storing part 50 stores an XML document input through a network interface 106 or an input device such as a keyboard/mouse 109 shown in FIG. 1 or a drive for reading out the concerned XML document from a storage medium that stores the XML document to be an objective of processing.

A data structure generation part 20 generates a data structure to be used for an evaluation with an evaluation execution part 40 from an XPath expression stored in an XPath storing part 10. If an XPath stored in an XPath storing part 10 is changed (added or deleted), a data structure is updated according to this change. With using such a data structure, an evaluation can be executed more efficiently than in the case that a plurality of XPath expressions stored in an XPath storing part 10 are evaluated independently with respect to an XML document. Detail for this data structure, evaluation methods using this data structure and generation methods of this data structure will be described below.

An evaluation execution part 40 executes an evaluation (matching) of an XPath expression by using a data structure generated at a data structure generation part 20 with respect to an XML document stored at an XML document storing part 50. Thereby, it is efficiently evaluated whether the concerned input document has a certain part specified with an XPath expression stored in an XPath storing part 10 or not. An evaluation result with an evaluation execution part 40 is stored in a predetermined area of a main memory 103.

An XML document processing unit 60 reads out an evaluation result with an evaluation execution part 40 from a predetermined area of a main memory 103, and if an XML document stored in an XML document storing part 50 is determined to have a certain part specified with an XPath expression stored at an XPath storing part 10 on the basis of the evaluation result, the XML document processing unit 60 reads out the XML document as an objective of processing from an XML document storing part 50 and executes predetermined information processing, i.e., information processing previously provided as an application.

A method for streamlining an evaluation of an XPath expression in the embodiment will now be described in detail.

In the embodiment, evaluation processing is speeded up by generating a data structure for sharing a common part of a plurality of XPath expressions and evaluating with respect to an XML document by using the data structure. In the embodiment, the following three approaches are presented to implement this: Approach 1—sharing an evaluation of a step among a plurality of location paths; Approach 2—sharing an evaluation of a subexpression or an argument among a plurality of operation expressions or functions; Approach 3—speeding up a predicate of a location path.

Each approach will be described below.

Approach 1. Sharing an Evaluation of a Step Among a Plurality of Location Paths

A case that following three XPath expressions P1, P2 and P3 are stored in an XPath storing part 10 and the XPath expressions are evaluated with respect to an XML document will be described as an example.

P1:/profile/demographics/age[text( )<20]

P2:/profile/interests/sport[text( )='Soccer']

P3:/profile/demographics/age[text( )>=40 and text( )<50]

Initially, a data structure that combined the above-mentioned XPath expressions P1, P2 and P3 is generated with a data structure generation part 20.

The data structure generation part 20 decomposes the above-mentioned XPath expressions into steps to generate this data structure. When a step consists of an axis, a set of node test and a predicate, they are also decomposed. In other word, an XPath expression P1 is decomposed to the following P1', P2 to P2', and P3 to P3', respectively.

P1': profile+demographics+age+[text( )<20]

P2': profile+interests+sport+[text( )='Soccer']

P3': profile+demographics+age+[text( )>=40 and text( )<50]

Comparing P1', P2' and P3', these three XPaths have 'profile' as a common step. P1' and P3' have subsequent step 'demographics' in common. Therefore, by combining a common step, these XPath expressions can be represented in a tree structure.

In other words, a data structure generation part 20 functions as a step decomposing means for decomposing an XPath into steps and a tree generation means for generating a tree structure (data structure) with a node corresponding to each step in this processing.

FIG. 3 is a diagram showing a data structure (tree structure) generated at a data structure generation part 20.

Next, an evaluation execution part 40 evaluates XPath expressions P1, P2 and P3 with respect to an XML document by using a tree data structure generated in the above-mentioned manner.

An example to evaluate XPath expressions P1, P2 and P3 with respect to an XML document shown in FIG. 4 will be discussed here.

(1) Evaluation of an XPath expression P1

A leading step of an XPath expression P1 'profile' is initially evaluated with respect to an XML document D1 shown in FIG. 4. The evaluation result is a node set with following four elements.

N1:
{<name>Alan</name>,
<demographics><age>35</age></demographics>,
<location><city>Osaka</city></location>,
<interests><sport>Soccer</sport><music>Classical</music><book>
History</book></interests>}

When the next step of an XPath expression P1 is applied for each of four elements in a node set N1, the result is as follows:
{ }, {<age>35</age>}, { }, { }

Combining these four node sets to create a node set for this step, the result will be as follows:
N2:
{<age>35</age>}

When 'age' is applied to an element of this node set N2, the result comes out as follows:
N3:
{35}

When '[text( )<20]' is further applied to the node set N3, the result comes out an empty node set, which is obtained as an evaluation result for an XPath expression P1.

(2) Evaluation of an XPath expression P2

Next, an XPath expression P2 is evaluated. In this case, an evaluation result for a leading step 'profile' for an XPath expression P2 has been obtained as a node set N1. Therefore, processing for this evaluation is not actually performed and the evaluation result that has already been obtained is used. When 'interests' is applied to each element of a node set N1, respective results are as follows:
{ }, { }, { }, {<sport>Soccer</sport>, <music>Classical</music>, <book>History</book>}

Combining these four node sets to create a node set for this step results in as follows:
N4:
{<sport>Soccer</sport>,<music>Classical</music>, <book>History</boo k>}

When 'sport', which is a remaining representation of XPath expression P2 is applied to three elements of a node set N4, and then '[text( )='Soccer']' to the result, it comes out as follows:
{Soccer}, { }, { }

Combining them results in
{Soccer} which is obtained as an evaluation result for an XPath expression P2.

(3) Evaluation of an XPath expression P3

Finally, an XPath expression P3 is evaluated. Here, an evaluation value for the part of '/profile/demographics/age' in an XPath P3 location path with respect to an XML document D1 has been obtained as a node set N3. Therefore, processing for an evaluation of this part is not actually performed and the evaluation result that has been obtained is used. When the last predicate '[text( )>=40 and text( )<50]' of an XPath P3 is applied to each element of the node set N3, the result is an empty node set, which is obtained as an evaluation result for an XPath expression P3.

According to the above-mentioned manner, an amount of calculation time for a plurality of XPath expressions can be shortened by using a data structure shown in FIG. 3, performing an actual calculation for only once for a step common to a plurality of XPath expressions, and sharing the evaluation result.

Although in the above-mentioned example, an XPath expression is described to be evaluated in any order, a storage area of a memory required in an evaluation can be reduced by evaluating either in the order of depth priorities or width priorities induced from a data structure in FIG. 3. For example, if an evaluation is done in depth priorities, a storage area required for holding a predetermined node can be freed when evaluations for all partial trees with respect to the concerned node has finished. In contrast, if an evaluation is done in width priorities, a storage area required for holding an evaluation result for upper nodes can be freed after the concerned evaluation result has been used for lower nodes.

FIG. 5 is a flow chart illustrating a processing procedure with an evaluation execution part 40 in evaluating a plurality of XPath expressions in width priorities.

Referring to FIG. 5, an evaluation execution part 40 initially assigns a set including the entire XML document as a single element to the current node set (step 501). Then, leading steps of all location paths are included as elements of a set of steps (step 502). Then, the next processing is executed for all elements of the set of steps. In other words, steps are respectively evaluated for each element of the current node set (step 504). Next, all of the evaluation results are combined to be assigned to the current node set (step 505).

After processing of steps 504 and 505 has been executed for all elements of a set of steps, next set of steps is sought with respect to all elements in a set of steps. Then, the evaluation results are combined to be replaced with the current set of steps (steps 503, 506).

If any element is left in the set of steps, processing of steps from 503 to 506 is repeated. The processing finishes when the set of steps is cleared of elements.

In other words, in the above-mentioned processing, a evaluation execution part 40 functions as a partial evaluation means for evaluating for each step corresponding to a node of a data structure and as an evaluation results combination means for obtaining an evaluation result for the entire XPath expression by combining evaluation results for respective steps in evaluating each XPath expression. When evaluating a step common to other XPath expressions, if any evaluation result from an evaluation of other XPath expressions for the step exists, evaluation processing for the step is omitted by using this evaluation result as an evaluation result for the step of the concerned XPath expression.

A basic property of an XPath for this approach is that the same result as one obtained from an evaluation of the entire path can be obtained by evaluating representations of a location path to the halfway to obtain a node set; then evaluating the remaining representations of the path by using each element of the obtained node set as a context node; and finally combining the results. In other words, in the above-mentioned procedure, a common part is extracted from a location path of each XPath expression, the common part and the other parts are evaluated separately, and the evaluation results are combined. If an evaluation result for the part that can share the evaluation result (a common part of a location path) has been in this process, that existing evaluation result is used by omitting evaluation results for the part. Therefore, when a path can be decomposed to meet this property, this approach is applicable.

In the above description, the case in which 'child' as a default is selected by omitting an axis is exemplified.

However, even the case in which an axis explicitly writes in such way as 'descendant::age' other than 'child' can be dealt with Approach 1. The case in which '//' is used as a separator between steps instead of '/' can also be dealt with. '.', '..', '*', 'comment( )', etc. can be described in addition to an element name as a node test. For example, such an XPath expression described in the following way can be dealt with Approach 1.

/*//interest/../demographics/descendant::age[text( )<20]

Approach 2. Sharing an Evaluation of a Subexpression or an Argument Among a Plurality of Operation Expressions or Functions For the above-mentioned Approach 1, an approach for speeding up an evaluation of a location path is described. Although a location path expression is a main expression in an XPath, operation expressions such as an arithmetical operation, a comparison operation, a logical operation and functions are used for describing a condition of a path predicate or for generating data to be used by other programs. Therefore, an approach below for speeding up expressions other than a location path is used.

A case of following three XPath expressions P1, P2 and P3 being stored in an XPath storing part 10 and the XPath expressions being evaluated with respect to an XML document will be described as an example.

P7:
(/CPEXMLv1/person/partyActivities/food
 [favoriteFood='Hamburger'] or
(not(/CPEXMLv1/person/partyActivities/hobby
 [typeName='SPORT'])and
/CPEXMLv1/person/personDemographics/birthDate
 [year<1960])) and
/CPEXMLv1/person/partyActivities/hobby/startDate
 [year=1986]

P8:
(/CPEXMLv1/person/partyDemographics
 [gender='MALE'] or
(not(/CPEXMLv1/person/partyActivities/hobby
 [typeName='SPORT']) and
/CPEXMLv1/person/personDemographics/birthDate
 [year<1960])) and
/CPEXMLv1/person/partyActivities/hobby/startDate
 [year>1990]

P9:
/CPEXMLv1/person/partyActivities/food
 [favoriteFood='Hamburger'] and
/CPEXMLv1/person/partyActivities/hobby/startDate
 [year>1990]

A data structure generation part 20 initially decomposes the XPath expressions P7, P8 and P9 into subexpressions consisting of location paths. In other words, an XPath expression P7 is decomposed into P71-P74, P8 into P81-P84, P9 into P91 and P92, respectively.

P71:/CPEXMLv1/person/partyActivities/food
 [favoriteFood='Hamburger']
P72:/CPEXMLv1/person/partyActivities/hobby
 [typeName='SPORT']
P73:/CPEXMLv1/person/parsonDemographics/birthDate
 [year=1960]
P74:/CPEXMLv1/person/partyActivities/hobby/startDate
 [year=1986]
P81:/CPEXMLv1/person/partyDemographics
 [gender='MALE']
P82:/CPEXMLv1/person/partyActivities/hobby
 [typeName='SPORT']
P83:/CPEXMLv1/person/personDemographics/birthDate
 [year<1960]
P84:/CPEXMLv1/person/partyActivities/hobby/startDate
 [year>1990]
P91:/CPEXMLv1/person/partyActivities/food
 [favoriteFood='Hamburger']
P92:/CPEXMLv1/person/partyActivities/hobby/startDate
 [year>1990]

Within the above subexpressions, P71 and P91, P72 and P82, P73 and P83, P84 and P92 are the same expressions. Therefore, XPath expressions P7, P8, P9 can be represented in a non-repeating directed graph (DAG).

FIG. 6 is a diagram illustrating a non-repeating directed graph representing XPath expressions P7, P8 and P9.

For six location paths shown at the left side of FIG. 6, an approach of sharing an evaluation of a step by the above-mentioned Approach 1 can be used. Therefore, this part is converted into a data structure of a tree structure described in FIG. 3. The generated data structure of a non-repeating directed graph is stored in a data structure-storing part 30 along with a data structure in a tree structure generated at Approach 1.

An evaluation execution part 40 evaluates XPath expressions P7, P8 and P9 by using a data structure obtained in the above manner. At first, a location path part is evaluated by using Approach 1. Next, each XPath expression is evaluated with a non-repeating directed graph shown in FIG. 6. At this point, a subexpression common to XPath expressions is evaluated for once for all and its evaluation result is reused for the common part, for the XPath expressions with a common subexpression.

Although a logical operation, in which an argument is a node set and the evaluated value is a true value, is exemplified in the above case, operation expressions in other data type such as an arithmetical operation can be optimized similarly.

Approach 3. Speeding Up a Predicate of a Location Path

In the above-mentioned Approach 1, steps with different predicates are described to be processed as separate steps. However, utilizing similarity among similar predicates can speed up the execution of predicates.

For example, such predicates as in the form of '[(expression) (comparison operator) (constant)]', such as '[age<20]' are speeded up. If it is not explicitly represented in this way, this approach can be applied to the predicate that can be converted into this form by replacement or partial calculation. For example, this approach can be applied to the specification '[2]' with a location of a node, which can be replaced into '[position( )=2]'.

The cases of: (1) a comparison operator is '='; (2) a comparison operator is '!='; and (3) a comparison operator is '>' will now be specifically described.

(1) speeding up when a comparison operator is '='

A hash table for searching for a remaining location path is created by using an evaluation result of a predicate expression in a step as a key. For example, an XPath expression which takes different values for 'XYZ' part of /CPEXMLv1/person/partyActivities/hobby [typeName='XYZ']/ . . . , such as the following XPath expressions P41, P42, P43, P44, is considered.

P41:
/CPEXMLv1/person/partyActivities/hobby
 [typeName='SPORT']/startDate/year
P42:
/CPEXMLv1/person/partyActivities/hobby
 [typeName='MUSIC']/composer P43:
/CPEXMLv1/person/partyActivities/hobby
   [typeName='SPORT']/hobbyName
P44:
/CPEXMLv1/person/partyActivities/hobby
   [typeName='COMPUTER]/software A data structure generation part 20 generates the following hash tables for the above-XPath expressions P41, P42, P43 and P44.

A searched set is {srartDate/year, hobbyName} when a key is 'SPORT'

A searched set is {composer} when a key is 'MUSIC'

A searched set is {software} when a key is 'COMPUTER'

For the part up to /CPEXMLv1/person/partyActivities/hobby, a step evaluation can be shared according to Approach 1; so that a data structure for this part is generated (This part has no branch in a tree structure because all of the XPath expressions P41, P42, P43 and P44 are same.). The generated hash table is stored in a data structure storing part 30 along with a data structure in a tree structure generated at Approach 1.

An evaluation execution part 40 initially evaluates a step /CPEXMLv1/person/partyActivities/hobby according to the above-mentioned Approach 1 to obtain a node set. Then the evaluation execution part 40 executes processing with the above-mentioned hash table for each node of a node set.

FIG. 7 is a flow chart illustrating a flow of evaluation processing using a hash table.

Referring to FIG. 7, a left side expression of a predicate ('typeName' in this case) is evaluated first (step 701). Next, a hash table is searched for by using a left side expression value as a key, and if the searched result is obtained, evaluate the obtained location path with respect to the concerned node and return the evaluation result (steps 703, 704). In contrast, if the searched result is not obtained, return an empty node set (steps 703, 705).

By using the above-mentioned Approach 3, a predicate does not need to be evaluated as many times as the number of XPaths with respect to a single node, so that same result as the result obtained from evaluations for all predicates with respect to a single node can be obtained from a single table search. For example, if typeName is 'MUSIC', a single table search determines that a predicate of an XPath expression P42 is true and predicates of P41, P42 and P43 are false.

Given that the number of XPath expressions is 'n' and the number of nodes included in a node set is 'm', it takes a time period of O (n×m) to check a predicate for evaluating all XPaths with respect to all nodes without using Approach 3 (O (n×m) means that a calculation can be executed within a time period of n×m multiplied by a constant). In contrast, if Approach 3 is used, a hash table search, which can be executed virtually within a constant time period, is executed for 'm' times. Therefore, when 'n' is too large, Approach 3 can speed up evaluation processing significantly.

(2) speeding up when a comparison operator is '!='

If a set of remaining location paths which is searched with a key of Ki, is Pi, when the above-mentioned comparison operation is '=' if a comparison operation is '!=', a hash table is configured so that a set of remaining location paths to be searched with a key of Kj will be $\cup_{i \neq j}$Pi. For XPath expressions P41, P42, P43 and P44, a hash table returning the following search results is configured.

When a key is 'SPORT', {composer, software}
When a key is 'MUSIC', {startDate/year, hobbyName, software}
When a key is 'COMPUTER', {startDate/year, composer, hobbyName}

Because the entire processing is same as that of the case (1) where a comparison operator is '=', except for using the above-mentioned hash table, the description thereof is omitted.

(3) speeding up when a comparison operator is '>'

If a comparison operator is '>', a data structure generation part 20 creates a binary search tree for searching by using a constant in a predicate of a step as a key. For example, when two XPath expressions P5 and P6 exist, P5:/CPEXMLv1/person/personDemographics/birthDate
   [year>1990]/gender P6:/CPEXMLv1/person/personDemographics/birthDate
   [year>1976]/birthplace a binary search tree for executing the following calculation is configured.

```
if (Key>1990) then
   {gender, birthplace}
else
   if (key>1976) then
      {birthplace}
   else
      { }
   endif
endif
```

A generated binary tree is stored in a data structure storing part 30 along with a data structure in a tree structure generated at Approach 1.

An evaluation execution part 40 evaluates steps up to /CPEXMLv1/person/personDemorgraphics/birthDate according to the above-mentioned Approach 1. Then, a left-side expression of a predicate ('year' in this case) is evaluated and the evaluated value is used as a key to search a binary search tree. As a result of this search, if the key is a value larger than 1990, both 'gender' and 'birthplace' are returned. If the key is a value same or less than 1990 and larger than 1976, 'birthplace' is returned. If no condition is met, an empty set is returned.

Given that the number of XPath expressions is 'n' and the number of nodes included in a node set is 'm', it takes a time period of O (n×m) to check a predicate for evaluating all XPaths with respect to all nodes without using Approach 3. In contrast, if Approach 3 is used, a binary search, which takes a time period of O (log n), is executed for 'm' times. Accordingly, if 'n' is too large, Approach 3 can significantly speed up the evaluation processing.

Although the case with a comparison operator being '>' is described hereinabove, of course the case with a comparison operator is '>=', '<' or '<=' can be dealt in the same way.

A method for a data structure generation part 20 to generate a data structure (see FIG. 3) to be used in an evaluation execution part 40 from an XPath expression stored in an XPath storing part 10 will now be described.

For generating a data structure to be used in the embodiment, principally a general various methods for generating a tree structure can be used, leaving methods for generating unlimited in particular. However, the embodiment presents a generation method that can efficiently reflect a change into a data structure, when an XPath stored in an XPath storing part 10 is changed (added or deleted). This method will be described below.

For shortening a time period required for evaluating an XPath expression with respect to an XML document, it may be a way to save a generated data structure in a data structure storing part 30 to be reused in processing among a plurality of XML documents, instead of generating a data structure as mentioned above for each time the processing is performed.

In addition, if a set of XPaths stored in an XPath storing part 10 is changed, a data structure for a desired set of XPaths can be efficiently obtained by reflecting each of the added XPath expressions and the deleted XPath expressions to a saved data structure instead of regenerating a data structure from the beginning.

In other words, if an XPath expression is newly added, a new node is generated for a step in the XPath expression, which does not have a node corresponding to an existing data structure, and the new node is added to the data structure. In contrast, if a predetermined XPath expression is deleted, only a node corresponding to a part unique to the XPath expression is removed from nodes corresponding to steps of the XPath expressions. In this manner, a data structure is efficiently updated.

FIG. 8 is a flow chart illustrating a method for generating a data structure with a data structure generation part 20.

In the embodiment, a desired data structure is obtained by adding an XPath expression in succession. Therefore, for the first time to generate a data structure, a predetermined XPath expression is selected from a set of XPaths stored in an XPath storing part 10, to which another XPath expression is added subsequently. In the case that a new XPath expression is added due to a change occurred to a set of XPaths, a step of a newly added XPath expression is added to an already generated data structure stored in a data structure storing part 30.

Referring to FIG. 8, a data structure generation part 20 initially decomposes an XPath expression P, which is to be added, into step s1, s2, . . . , sk (step 801). Then, parameter 'i' and parameter 'S' are initialized, i.e. make them i=1, and S='a set of steps at top level' (step 802), and then step 'si' is searched from a set of steps S (step 803).

If step 'si' is included in a set of steps S, then 'i+1' is a new value of a parameter 'i'(steps 804, 805), and whether the new 'i' is less than the number of steps 'k' in an XPath expression P or not is checked (step 806). If a value of 'i' is less than 'k', a parameter S is S='a set of steps at the next level of step 'si' in a data structure', and processing is repeated from step 803 (step 807).

On the other hand, if it is determined that a step 'si' is not included in a set of steps S at step 804, steps corresponding to si, . . . , sk are added to a data structure (step 808) and the XPath expression P is registered to a corresponding step of the data structure, then processing ends (step 809).

At step 806, if a new value of 'i' reaches the number of step 'k' in an XPath expression P, the XPath expression P is also registered to the corresponding step of the corresponding data structure, then processing ends (step 809).

Processing will be specifically described by exemplifying a case of adding the next XPath expression P4 to the data structure shown in FIG. 3.

P4:/profile/location/city[text( )='Tokyo']

An XPath expression P4 is initially decomposed into steps as follows at step 801.

s1=profile
s2=location
s3=city
s4=[test( )='Tokyo']

If a location path is represented in abbreviation, the path should be converted into a form that is not represented in abbreviation before decomposition. For example, a separator '//' between steps should be previously converted into 'decendant-or-self::node( )' and '.' into 'self::node( )'.

Initialization to i=1, S={profile} is executed at step 802. The process proceeds to step 807, where '{demographics, interests}', which is the next level step of 'profile', is substituted for S in a data structure because step s1 is included in a set of steps S and remaining steps also exists (steps 803-806).

Then, as it is determined that a value of step s2 'location' is not included in a set of steps S at step 804, the process proceeds to step 808, where steps corresponding to s2, s3 and s4 are added to a data structure. Then, an XPath expression P4 is registered into a data structure at step 809.

FIG. 9 is a diagram illustrating a data structure with an XPath expression P4 being added to the data structure of FIG. 3.

A data structure for speeding up step evaluation with the above-mentioned Approach 1 has been generated (updated). A generation (update) of a data structure to speed up an evaluation of an operation expression with Approach 2 will now be described.

At first, a location path is extracted from a newly added operation expression, and only the location path that has not been registered in an existing data structure is added to a data structure. A location path is added according to the procedure shown in a flow chart in FIG. 8.

Subexpressions other than a location path are searched to find out whether they have been appeared as a common subexpression. If they have been appeared as a common subexpression, a data structure for evaluating the common subexpression will be reused. If they have not been appeared as a common subexpression, a data structure for evaluating the subexpression will be newly created and added to an existing data structure.

Generation (update) of a data structure for speeding up an evaluation of a predicate with Approach 3 will now be described.

If predicate of step 'si' is any one of [<expression>=<constant>], [<expression>≠<constant>], [<expression><<constant>], [<expression><=<constant>], [<expression>><constant>], [<expression>>=<constant>], it is initially checked whether a hash table corresponding to an expression (or a binary tree) exists or not in step 808 shown in FIG. 8. If the corresponding hash table (or a binary tree) does not exist, they are created. In other words, a search item with a constant as a key is added to an existing hash table (or a binary tree). Then, remaining step sequence (si+1, . . . , sk) is made in a tree structure and added to an existing data structure. Addition to the data structure is executed according to the procedure shown in a flow chart of FIG. 8.

FIG. 10 is a flow chart illustrating processing of a data structure generation part 20 at removal of a predetermined XPath expression from a data structure.

Referring to FIG. 10, a data structure generation part 20 initially make a parameter 's' as s='a step whose XPath expression P is registered on a data structure' (step 1001), and removes an XPath expression P from step 's'(step 1002).

Next, the number of XPath expressions registered at a step 's' is checked whether it is 0 or not. If it is not 0, the process ends (step 1003).

In contrast, if the number of XPaths registered at a step 's' is 0, a parameter 'sp' is made to be sp='step upper than step 's' by one within a data structure' (step 1004) and a step 's' is removed from a step 'sp' (step 1005). Then, the number of steps lower than a step 'sp' by one is checked whether it is 0 or not. If it is not 0, the process ends (step 1006).

In contrast, if the number of steps lower than a step 'sp' by one is 0, the process returns to step 1004 as make it s=sp (step 1007), and process is repeated for a new step 's'.

Processing will be specifically described by exemplifying the case that an XPath expression P3 is removed from a data structure shown in FIG. 9.

A step on a data structure '[text( )>=40 and text<50]' is assigned to a parameter 's' at step 1001. When an XPath expression P3 is removed from it, the number of XPath expressions registered at a step 's' becomes 0. Then the process proceeds to step 1004. Then a step 's' is removed from an upper step 'demographics' of the step 's' at step 1005. In this case, as it is determined that the number of lower steps of 'demographics' is not 0 at step 1006, the process ends here.

FIG. 11 is a diagram for illustrating a data structure with an XPath expression P3 being removed from a data structure shown in FIG. 9.

A data structure for speeding up an evaluation of steps with the above-mentioned Approach 1 has been updated. Updating a data structure for speeding up an evaluation of an operation expression with Approach 2 will now be described.

A location path is extracted from an operation expression to be removed; a location path that is solely used by the operation expression is searched for; and the location path is removed from a data structure. A check of whether a predetermined location path is solely used by an operation expression to be removed or not can be executed in an approach such as controlling the number of reference for a location path.

Additionally, for subexpressions other than location paths, a subexpression that is solely used by the operation expression is sought and removed from a data structure.

Updating a data structure for speeding up an evaluation of a predicate with Approach 3 will now be described.

At first, an item corresponding to a constant of a predicate is removed from a hash table (binary tree). Then, a location path searched from the item is deleted from a data structure. A location path is deleted according to the procedure shown in a flow chart of FIG. 10.

Operation of the embodiment will now be described with XPath expressions and XML documents as a specific example.

Assuming that the following four XPath expressions are stored in an XPath storing part 10.
P11:/profile/interests[sport/@type='Soccer']/music
P12:/profile/interests[sport/@type='Baseball']/book
P13:/profile/demographics/age
P14:count(/profile/interests[sport/@type='Soccer']>1

A data structure generation part 20 generates a data structure with respect to the above four XPath expressions P11, P12, P13 and P14 in the procedure shown in FIG. 8. XPath expressions P11, P12, P13 and P14 will be described below as they are added to an empty tree structure (initial condition) in succession.

Addition of P11:
(1) Decompose a location path into three steps of 'profile', 'interests[sport/@type='Soccer']', and 'music' (step 801).
(2) As step 'profile' is not registered at a data structure, the step is added and registered (steps 804, 808, 809).
(3) Decompose a step 'interests[sport/@type='Soccer']' into 'interests' and '[sport/@type='Soccer']'.
(4) As step 'interests' is not registered at a data structure, the step is added and registered (steps 804, 808, 809).

(5) As a hash table for a predicate does not exist, a hash table is generated.
(6) Create a data structure representing a location path 'sport/@type', a left side expression of a predicate to add to the hash table.
(7) Add an entry, in which a key is 'Soccer' and a value is a remaining step 'music', to the hash table.

Addition of P12:
(1) Decompose a location path into three steps of 'profile', 'interests[sport/@type='Baseball']', and 'book' (step 801).
(2) As step 'profile' and 'interests' have been registered at a data structure and a data structure for 'sport/@type' has also added to a corresponding hash table, addition to a data structure is not executed, executing only the registration of an XPath expression P12 (step 809).
(3) Add an entry, in which a key is 'Baseball' and a value is a remaining step 'book', to the hash entry.

Addition of P13:
(1) Decompose a location path into three steps of 'profile', 'demographics', and 'age' (step 801).
(2) As a step 'profile' is registered but 'demographics' and 'age' are not registered, add 'demographics' and 'age' as steps at a data structure, and register an XPath expression P13 (steps 804, 808, 809).

Addition of P14
(1) Decompose an expression into subexpressions and extract a location path '/profile/interests[sport/@type='Baseball']'.
(2) As the location path '/profile/interests[sport/@type='Baseball']' has been registered, generate a data structure to pass the result to a function 'count' and also pass the result of a function 'count' to a comparison operator.

The data structure representing four XPath expressions P11, P12, P13 and P14 have been generated.

FIG. 12 is a diagram showing a generated data structure.

A generated data structure is stored and saved in a data structure-storing part 30.

Here, it is assumed that an XML document shown in FIG. 13 has been input and stored in an XML document-storing part 50. An evaluation execution part 40 reads out this XML document from an XML document storing part 50, and evaluates XPath expressions P11, P12, P13 and P14 by using a data structure stored in a data structure storing part 30.

Initially, the first step "profile" is executed and a node set N1 consisting of two elements is obtained.
N1:

```
{ <demographices>
    <age>19</age>
  </demographics>,
  <interests>
    <sport type@='Baseball'/>
    <book>History<book/>
  </interests>
}
```

Next, a step "interests" is applied to each element of a node set N1 and the following two node sets are obtained.
{ }
{<sport type@='Baseball'/>, <book>History<book/>}

Then, these two node sets are combined and a node set N2, which is the result of 'interest' is obtained.

N2:

{<sport type@='Baseball'/>, <book>History<book/>}

The left side expression 'sport/@type' is evaluated with respect to two elements of node set N2, then { } and {'Baseball'} are obtained, respectively.

Next, a hash table is searched by using 'Baseball' as a key, and a step 'book' and a function 'count' are obtained. 'book' is evaluated with respect to two elements of node set N2, then { } and {History} are obtained. These two are combined, and an evaluated value for an XPath expression P2:{History} is obtained.

Then, a function 'count' is evaluated by using {<sport type@='Baseball'/> as an argument, the value comes out 1. As a comparison operation with this value 1 are evaluated, it will be 'false'. Then, an evaluated value for an XPath expression P4: false is obtained.

Next, a step 'demographics' is applied to each element of a node set N1 and the results are combined to be '{<age>19</age>}'. A step 'age' is further applied to this element, and an evaluated value for an XPath expression P3: {19} is obtained.

As a node to reach an XPath expression P1 even after visited a data structure does not exist, an evaluated value for an XPath expression P1: empty node set is obtained.

The embodiment of processing an evaluation of an XPath expression with an XML document processing system according to the embodiment will now be described.

In the embodiment, the entire execution time is shortened by fragmenting an XPath expression into steps as stated above, and then by changing execution sequence or by reducing the number of execution with respect to execution of XPath fragments obtained from the fragmentation.

A fragment of an XPath expression is also an XPath expression; a package 'org.apache.xpath' of an XPath processor included in an XSLT processor Xalan-Java® 2 provided in Apache XML Project (hereinafter merely referred to as Xalan) is used to execute this fragment. For example, a function of Xalan is used as it is for executing a step of a location path or for evaluating an arithmetic expression. Therefore, how much the present invention streamlines an evaluation of an XPath is directly known from the difference between an execution only with Xalan and an execution with Xalan in an XML document processing system according to the present invention.

In the embodiment, many XPath expressions are provided for an XML document defined by CPExchange (IDEAlliance, CPExchange Specification Version 1.0, 2000. (http://www.cpexchange.org/)). An appropriate XPath expression for a given XML document is selected from the XPath expressions. XPath expressions are generated in the following pattern with different XYZ, and registered to a system.

/CPEXMLV1/person/partyActivities/hobby
  [typeName='XYZ']
/CPEXMLV1/person/partyActivities/hobby
  [hobbyName='XYZ']
/CPEXMLV1/person/partyActivities/food
  [favoriteFood='XYZ']
/CPEXMLV1/person/personDemographics/gender
  [@enumtype='XYZ']
/CPEXMLV1/personName[firstName='XYZ']
/CPEXMLV1/person/partyActivities/hobby/startDate
  [year!='XYZ']
/CPEXMLV1/person/personDemographics/birthDate
  [year='XYZ']
/CPEXMLV1/person/partyActivities/newspaper/startDate
  [year='XYZ']
/CPEXMLV1/person/partyActivities/hobby/startDate
  [year='XYZ']
/CPEXMLV1/person/partyActivities/magazine/startDate
  [year='XYZ']

As an operating environment for a system, 800 MHz of a mobile Pentium® III from U.S. Intel is used for a CPU 101, 128 MB of a RAM (Random Access Memory) for a main memory 103, and Windows® 2000 from U.S. Microsoft for an operating system.

FIG. 14 is a diagram illustrating an execution time taken for evaluating an XPath expression according to the embodiment. In FIG. 14, two kinds of execution time measured respectively in (1) a system for evaluating an XPath expression solely with an Xalan, and (2) a system for evaluating with the combination of approaches according to the present invention and an Xalan are shown.

Referring to FIG. 14, in a system solely using an Xalan, an execution time lineally increases with regard to the increase in the number of XPath expressions. In contrast, in a system using an Xalan in the embodiment, an execution time shows little increase with regard to the increase in the number of XPath expressions. Accordingly, the difference between two cases becomes larger as the number of XPath expressions increases.

Second Embodiment

In the above-mentioned first-embodiment, processing of evaluation is speeded up by evaluating an XML document with a data structure, which shares a common part of a plurality of XPath expressions to be evaluated, and sharing the result. In contrast, in the second embodiment, processing of evaluation is speeded up by analyzing dependency among a plurality of XPath expressions to be evaluated, evaluating with a data structure with a redundant part of a plurality of XPath expressions omitted on the basis of the obtained dependency to simplify the processing of evaluation. The embodiment will be described by exemplifying the case in which whether an XPath expression within an annotation correctly specifies a predetermined element of an objective web page or not is evaluated in order to add an annotation to a web page.

A web page processing system according to the second embodiment is embodied in a computer system with a hardware configuration shown in FIG. 1, for example, as in the case of the first embodiment.

FIG. 15 is a block diagram illustrating a function of a web page processing system according to the second embodiment.

Referring to FIG. 15, the embodiment includes an XPath storing part 1510 that stores a plurality of XPath expressions specifying a certain part of a web page to be an objective of processing (HTML document), a data structure generation part 1520 that generates a data structure for performing an efficient evaluation according to the embodiment from the XPath expressions stored in an XPath storing part 1510, a data structure storing part 1530 that stores a data structure generated at a data structure generation part 1520 and an evaluation execution part 1540 that evaluates an XPath expression with respect to a web page to be an objective of processing by using a data structure stored in a data structure storing part 1530, as well as a document storing part 1550 that stores a web page to be an objective of processing and a document processing unit 1560 that performs a predetermined information processing with respect to a web page, which has been subjected to an evaluation with an evaluation execution part 1540.

In a system configuration shown in FIG. 15, a data structure generation part 1520, an evaluation execution part 1540 and a document processing unit 1560 are virtual software blocks embodied in a CPU 101 controlled by a program shown in FIG. 1. A Program controlling a CPU 101 to implement each of these functions is provided and read in a main memory 103 by stored and distributed on a magnetic disk or an optical disk, a semiconductor memory or other storage media, or by delivered over a network. An XPath storing part 1510, a data structure storing part 1530 and a document storing part 1550 are implemented at a main memory 103. Data and program held in a main memory 103 can be saved on a storage device such as a harddisk 105 as required.

In a system configuration shown in FIG. 15, an XPath storing part 1510 stores a plurality of previously prepared XPath expressions to be evaluated with respect to a web page. A data structure storing part 1530 stores a data structure that is generated at a data structure generation part 1520 to be used in an evaluation execution part 1540. A document storing part 1550 stores a web page that input through a network interface 106 or an input device such as a keyboard/mouse 109 shown in FIG. 1 or a drive for reading out the concerned web page from a storage medium that stores the web page to be an objective of processing.

A data structure generation part 1520 generates a data structure to be used for an evaluation by an evaluation execution part 1540 from XPath expressions stored in an XPath storing part 1510. By using this data structure, an evaluation can be executed more efficiently than in the case that a plurality of XPath expressions stored in an XPath storing part 1510 are separately evaluated with respect to a web page. Detail of this data structure and a method for evaluating by means of this data structure and a method for generating this data structure will be described below.

An evaluation execution part 1540 is an XPath engine and executes an evaluation (matching) of an XPath expression by using a data structure generated at a data structure generation part 1520 with respect to a web page stored in a document storing part 1550. Thereby, it is efficiently evaluated whether the concerned input document has a certain part specified by an XPath expression stored in an XPath storing part 1510 or not. Evaluation results from an evaluation execution part 1540 are stored in a predetermined area in a main memory 103.

A document-processing unit 1560 reads out an evaluation result of an evaluation execution part 1540 from a predetermined area of a main memory 103. If a web page stored at a document storing part 1550 has a certain part specified by an XPath expression stored in an XPath storing part 1510 on the basis of the evaluation result, the document processing unit 1560 reads out the web page as an objective of processing from the document storing part 1550 and executes an intended predetermined information processing, i.e., processing of adding an annotation to a web page.

A method for streamlining an evaluation of an XPath expression according to the embodiment will now be described.

In an operation of adding an annotation to a web page, it is necessary to evaluate whether a plurality of XPath expressions in the concerned annotation correctly specifies a predetermined element of an objective web page or not to determine whether a predetermined annotation is applicable to a predetermined web page or not. In other words, this could be expressed as a problem of evaluating whether a set of a plurality of XPath expressions (hereinafter referred to an XPath set) matches the concerned web page or not. Mating of an XPath set with a web page means all of the XPath expressions included in the XPath set match the structure of the concerned web page. The embodiment, particularly intends to the streamlining of an evaluation processing in the case of determining an XPath set that matches a web page among a plurality of XPath sets, as in the case of searching an annotation applicable for a predetermined web page among a plurality of annotations.

The embodiment speeds up processing of evaluation in the above-mentioned case by generating a data structure for simplifying an evaluation of an XPath expression on the basis of dependency among a plurality of XPath expressions and by evaluating a web page by means of this data structure. In the embodiment, different algorithms are applied on the basis of a type of an evaluation execution part 1540 (TYPE 1 and TYPE 2 shown below).

TYPE 1: Call overhead for an XPath evaluation function is large. Smaller number of evaluations of an XPath expression can improves an entire performance of a system (processing efficiency).

TYPE 2: Call overhead for an XPath evaluation function is small. An entire performance of a system (processing efficiency) does not significantly deteriorate even through an evaluation of an XPath expression after it has been separated.

The case in which a type of an evaluation execution part 1540 is in TYPE 1 will now be described.

In this case, as smaller number of an evaluation of an XPath improves performance of a system, a data structure generation part 1520 does not separate an XPath expression within a data structure to be generated. Specifically, processing such as:

1. narrowing down of XPath expressions on the basis of similarity among XPath expressions;
2. simplifying of a connected XPath expression on the basis of dependency among XPath expressions;
3. omitting of XPath expressions on the basis of dependency among XPath expressions;
4. integration of XPath expressions;
5. priority sequencing of evaluation processing on the basis of the length of a tree and locations on a DOM tree for an XPath; and
6. construction of a data structure for determination of execution timeare executed.

Each processing will be described below. Terms "an XPath expression holds" or "an XPath will be true" used hereinafter mean "an element corresponding to an XPath expression exists in a web page to be evaluated".

1. Narrowing Down of XPath Expressions on the Basis of Similarity Among XPath Expressions An XPath expression included commonly in a plurality of XPath sets is not involved in determination of an XPath set which matches a web page. The reason for this is that an evaluation result for such an XPath expression is common to (is not differentiated for) each XPath set. Therefore, an evaluation of an XPath that is not included in a plurality of XPath sets (specific XPath) is executed before others.

FIG. 16 is a table listing XPath sets and XPath expressions included therein. In an example shown in FIG. 16, a plurality of XPath expressions are included in each of four kinds of XPath sets (A, B, C, D). XPath expressions shown in FIG. 16 include much redundancy. For example, an XPath expression at No. 5 (XPath set A) is identical to an XPath expression at No. 14 (XPath set B).

FIG. 17 is a diagram listing XPath expressions shown in FIG. 16 with redundancy got rid of and identifying information (XPath ID) assigned. In an example shown in FIG. 17, 31 XPath expressions shown in FIG. 16 are reduced to 18.

FIG. 18 is a diagram illustrating reduced XPath expressions shown in FIG. 17 with further analyzed and extracted of XPath expressions common to a plurality of XPath sets in a graph structure.

Referring to 17, an XPath expression X7 is commonly included in XPath sets C and D and an XPath expression X1, X2, X3 and X18 are commonly included in all XPath sets. In the example of FIG. 18, each XPath expression unique to each XPath set is described with a node, which represents XPath expressions commonly included in the plurality of XPath sets, branched into respective XPath sets. Therefore, in the example of FIG. 18, objectives of evaluation will be narrowed down to 13 types of XPath expressions (X4-X6, X8-X17) added to a node, which represents each XPath set.

2. Simplifying of a Connected XPath Expression on the Basis of Dependency Among XPath Expressions A connected XPath expression is an expression which connects a plurality of XPath expressions with an OR sign (|) For example, a connected XPath expression specifying one of two table contents (table [1], table[2]) placed at a predetermined location (body [1]) in a predetermined web page (html [1])

/html[1]/body[1]/table[1]/html[1]/body[1]/table[2]is considered. It is indicated that the XPath expression holds if either /html[1]/body[1]/table[1] or /html[1]/body[1]/table[2] exists in a predetermined web page. It is evident that if table[1] does not exist, table[2] does not exist from a description rule for an XPath expression. Therefore, for this connected XPath expression, it is enough to evaluate only the first half part, /html[1]/body[1]/table[1].

In such a case that a predetermined XPath expression (XPath 1) holds, and another XPath expression (XPath2) also holds, an XPath 2 is defined to depend on an XPath 1. A connected XPath is simplified by taking advantage of this feature.

Dependency between XPath expressions is broadly divided into the following two kinds:

Identical tag sibling relation
If
XPath 1/html[1]/body[1]/table[2]
XPath 2/html[1]/body[1]/table[1],
an XPath 1 and an XPath 2 are in sibling relation, so,
if an XPath 1 holds, an XPath 2 also holds, and
if an XPath 2 does not hold, an XPath 1 does not hold either.

Therefore, "an XPath 1 depends on an XPath 2."
Parent node relation
If
XPath 1/html[1]/body[1]/table[1]/tr[1]/td[1]
XPath 2/html[1]/body[1]/table[1],
an XPath 1 is a descendant of an XPath 2, so,
if an XPath 1 holds, an XPath 2 holds, and
if an XPath 2 does not hold, an XPath 1 does not hold either.

Therefore, "an XPath 1 depends on an XPath 2."

Simplification of a connected XPath expression is executed according to the following procedure.

At first, break a connected XPath expression and newly assign to an XPath ID. For example, as an XPath expression X1 shown in FIG. 7 is
/html[1]/body[1]/table[1]/tbody[1]/tr[1]/html[1]/body[1]/
  table[1]/tbody[1]/tr[2],
this expression can be broken into following two XPath expressions:
X1-1:/html[1]/body[1]/table[1]/tbody[1]/tr[1]
X1-2:/html[1]/body[1]/table[1]/tbody[1]/tr[2]

In a same manner, 13 kinds of XPath expressions, which were made objectives of evaluation in FIG. 18, are analyzed and broken. Then, dependency among the respective broken XPath expressions is examined.

FIG. 19 is a diagram illustrating dependency among the obtained broken XPath expressions in a tree structure. XPath expressions X6-5 and X7, each described in a circle in FIG. 19, are identical.

Referring to FIG. 19, a plurality of XPath expressions originally included in a single connected XPath expression (X1) like X11-3, X11-2, and X11-1 may have dependency each other. In this case, lower XPath expressions, X11-2 and X11-3 do not need to be evaluated from the reasons described below.

In other words, if X11-1 holds, the original connected XPath expression X1 holds, too. This is because of a feature that if at least one of XPath expressions in connected relation holds, a connected XPath expression including the expression also holds.

In contrast, due to dependency, if X11-1 does not hold, X11-2 nor X11-3 holds. Therefore, X11-2 and X11-3 do not influence the evaluation result of XPath expression X11.

A connected XPath expression is simplified by deleting an XPath expression dependent to other XPath expressions as described above.

FIG. 20 is a diagram illustrating a connected XPath expression simplified on the basis of dependency among XPath expressions shown in FIG. 19.

3. Omitting of XPath Expressions on the Basis of Dependency Among XPath Expressions In a plurality of XPath expressions, due to a restriction caused by a variation of structures or elements of a web page, if a evaluated result is obtained for one XPath expression, evaluation results for other XPath expressions may be evident. For example, the case, in which two XPath expressions specifying two table contents (table[1], table[2]) placed in a predetermined location (body[1]) in a predetermined web page (html[1])
XPath1/html[1]/body[1]/table[2]
XPath2/html[1]/body[1]/table[1]
are in an XPath set is considered. In this case, if an XPath 1 specifying table[2] exists, an XPath 2 specifying table[1] always exists too. Therefore, an XPath 2 does not need to be evaluated. An XPath expression to be evaluated is deleted by taking advantage of this feature.

Dependency among these XPaths will be described further in detail. A condition for a predetermined XPath set to hold is "holding of all XPath expressions included in" the XPath set. If either of the above-mentioned an XPath 1 and an XPath 2 does not hold, the entire XPath set will not hold. In other words, the following relation will be established.

If an XPath 1 holds, an XPath 2 holds, too.
If an XPath 1 does not hold, the entire XPath set does not hold either.

Due to the above-mentioned reason, it can be ignored whether an XPath 2 holds or not. In other words, "if all XPath sets that includes a predetermined XPath expression (an XPath 2 in the above case) appears at the end of a dependency tree (such a tree structure shown in FIGS. 19, 20), the XPath expression (an XPath 2 in the above case) can be omitted because the expression does not influence whether the set holds or not.

FIG. 21 is a diagram of XPath expressions omitted on the basis of dependency among XPath expressions shown in FIG. 20. FIG. 21 (A) is a diagram with XPath expressions to be omitted (X2, X7, X9) being marked up, while FIG. 21 (B) is a diagram with XPath expressions marked up in FIG. 21(A) being deleted from the dependency tree. Codes attached to XPath expressions in the diagram such as 'A', 'B', 'ABCD', indicate the XPath sets which include those XPath expressions. In FIG. 21, subscripts to X11 and X1 ('1' in X1-1, X11-1) are omitted. This is because these XPath expressions are converted from connected XPath expressions to single XPath expressions through processing of '2'.

4. Integration of XPath Expressions

To use an evaluation execution part 1540 of TYPE 1 with a large call overhead of an XPath evaluation function, a data structure generation part 1520 recombines a connected XPath expression broken at the analysis of dependency among XPath expressions at processing of '2', in order to reduce the number of XPath expressions to be evaluated.

FIG. 22 is a diagram illustrating the case that recombination is executed for what can be recombined with respect to an XPath expression in the dependency tree of XPath expressions shown in FIG. 21.

Combination processing is executed according to the following rule.

(1) The location of a combined XPath expression should be immediately below the parent node that is shard with all of the belonging XPath expressions.

(2) If no parent node exists, a combined XPath expression itself should be a rout node.

In the examples shown in FIGS. 21 and 22, as XPath expressions like X5-*, for example, three expressions of X5-4, X5-1, and X-2 exist (see FIG. 21(B)). When the XPath expressions are followed toward a rout respectively, they meet at X4. Then, all XPath expressions represented in X5-* are arranged in a single node immediately below X4 (see FIG. 22(A)), being recombined to make an XPath expression X5 (see FIG. 22 (B)). X6 and X17 are recombined in the same manner.

It is assumed that X5-2 is a child node of X18. In this case, as any sharing parent node does not exist, X5-* is recombined to be a node in the same level as X1, X3, X4 and X18 as a rout node.

5. Priority Sequencing of Evaluation Processing on the Basis of the Length of a Tree and Locations on a DOM Tree for an XPath In order to decide and weed out a XPath set that does not match a web page to be evaluated in an efficient manner, XPath expressions that intended to 'an element which does not likely to exist' are preferably processed before. Then, the order of XPath expressions to be evaluated (priorities) is decided with the following criteria.

(1) An XPath expression with long tree for an XPath expression (2) An XPath expression located after on a DOM tree for a web page to be evaluated (3) XPath expressions influence more XPath expressions when they hold are preferred on the basis of dependency among XPath expressions For example, an evaluation of /table[1] is executed after an evaluation of /table[1]/tr[1]/td[1] that includes more part toward the end (rule (1)). Between /table[1] and /table[2], an evaluation of /table[2] is executed before, because /table[2] appears 'after' /table[1] when the DOM tree is visited around, i.e., /table[2] specifies an element, which appears after one specified with /table[1] in the order of tags for HTML (rule (2)). This is because a probability of appearance for an XPath expression (/table[2]) placed after in the DOM tree is lower than that for an XPath expression (/table [1]) placed before in the DOM tree.

FIG. 23 is a diagram illustrating each node (an XPath expression) in the dependency tree shown in FIG. 22 added with priorities (the number in a circle) according to the above-mentioned rules. FIG. 24 is a table listing XPath expressions on the basis of the priorities shown in FIG. 23. In FIG. 24, other XPath expressions, on which each XPath expression depends (dependent XPath), dependency levels, tree lengths for each XPath expression are also described. 'Dependency level' used here refers to a depth of a tree when a rule node is 0. 'Tree length' refers to a length of a tree for the XPath expression itself. A tree length for a connected XPath expression represents the length of an XPath expression whose tree length is the longest of all the XPath expressions constituting the XPath expression.

In FIG. 23, XPath expressions X10 and X11 are both at dependency level three, the deepest dependency level. In other words, if the expressions hold, they influence more XPath expressions than the other expressions do. Between X10 and X11, X10 has a longer tree length. For this reason, priority of X10 is 1 and priority of X11 is 2. Between XPath expressions X12 and X13, which are equal both in dependency level and tree length, X13 is higher in priority because X13, which specifies /td[2]/table[1], is placed after than X12 on a DOM tree for a web page to be evaluated.

6. Construction of a Data Structure for Determination of Execution Time

An XPath set, which has been organized on the basis of dependency among XPath expressions in the above-mentioned manner, is converted into a data structure that can be referenced in matching processing with a web page (for example, a non-repeating directed graph structure) and save it in a predetermined storage device (for example, a main memory 103 shown in FIG. 1).

After a data structure for efficiently executing an evaluation of an XPath set is generated in the above-mentioned manner, an evaluation execution part 1540 evaluates with respect to a web page stored in a document storing part 1550 using the data structure.

As the evaluation execution part 1540 is in a type of improving the entire performance of a system for smaller number of evaluation of XPath expressions (TYPE 1) according to the above description, an evaluation is executed from the XPath expression at top priority in descending order according to the following procedure.

1. Select the XPath expression at top priority among XPath expressions to be processed, and evaluate with respect to a web page.

2. If an XPath expression to be evaluated matches, remove other XPath expressions, which depend on the XPath expression, (XPath expressions in lower priorities) from an evaluation, because they are guaranteed to match.

In contrast, if an XPath expression to be evaluated does not match, all XPath expressions included in an XPath set, which includes the XPath expression, will be removed from objective of evaluation, because the XPath set does not match the web page.

3. When processing for all XPath expressions unique to each XPath-set (specific XPath) has finished, the XPath set all of whose XPath expressions match may perfectly match the web page. Then, it is examined whether such an XPath set exists or not.

4. If such an XPath set exists, XPath expressions, which the XPath set shares with other XPath sets, are evaluated with respect to the XPath set.

In contrast, if such an XPath set does not exist, an XPath set that perfectly matches the web page does not exist either. Then, the processing ends here without evaluating XPath expressions, which the XPath set shares with other XPath sets.

If evaluation processing for an XPath set according to the embodiment is used as processing to decide an annotation to be added to a web page from a plurality of annotations, an annotation with an XPath set, all of whose XPath expressions are determined to match according to the above procedure, will be decided as an annotation that can be added to the web page.

The case, in which a type of an evaluation execution part 1540 is TYPE 2 will now be described.

In this case, the entire performance of a system does not significantly deteriorate even when an XPath expression is separated and evaluated. Therefore, a data structure generation part 1520 separates an XPath expression in a data structure to be generated and simplifies each XPath expression. Specifically, processing such as:

1. narrowing down of XPath expressions on the basis of similarity among XPath expressions;
2. simplification of a connected XPath expression on the basis of dependency among XPath expressions;
3. omitting of an XPath expression on the basis of dependency among XPath expressions;
4. separating an XPath expression;
5. priority sequencing of evaluation processing on the basis of a tree length and locations on a DOM tree for an XPath; and
6. construction of a data structure for determination of execution time are executed.

Processing from 1 to 3 among the above processing is same as in the case, in which the type of an evaluation execution part 1540 is TYPE 1. Therefore, the description for the processing is omitted.

4. Separating an XPath Expression

If an evaluation execution part 1540 of TYPE 2 with smaller call overhead for an XPath evaluation function is used, a data structure generation part 1520 speeds up processing by fragmenting a plurality of XPath expressions into a common part and a unique part, and evaluating each of them.

For example, the following two XPath expressions (XPath1, XPath2) share a part (node) of /html[1]/body[1]/table[1]/tr[1]/td[1].

XPath 1 /html[1]/body[1]/table[1]/tr[1]/td[1]/font[1]

XPath 2 /html[1]/body[1]/table[1]/tr[1]/td[1]/b[1]

Therefore, speedy processing can be implemented by evaluating the common node, and evaluating only font[1] and b[1] for relative path from the node. Here, relation between /html[1]/body[1]/table[1]/tr[1]/td[1] and /html[1]/body[1]/table[1]/tr[1]/td[1]/font[1] is called 'inclusive relation' and represented as '/html[1]/body[1]/table[1]/tr[1]/td[1]/font[1] includes /html[1]/body[1]/table[1]/tr[1]/td[1]'. On the basis of this inclusion relation, an XPath expression is separated into a common part and a unique part to make each part an XPath subexpression.

FIG. 25 is a table showing a list of XPath expressions obtained through the separation processing after simplification and omitting on the basis of dependency. XPath expressions PX1, PX2, and PX3 in the list are XPath subexpressions added according to the separation processing. It is evident that separation processing of these three XPath expressions has made each XPath expression significantly simple compared to XPath expressions listed in FIG. 17. FIG. 26 shows a dependency tree including PX1, PX2, and PX3.

5. Priority Sequencing of Evaluation Processing on the Basis of a Tree Length and Locations on a DOM Tree for an XPath In order to decide and weed out a XPath set that does not match a web page to be evaluated in an efficient manner, XPath expressions that intended to 'an element which does not likely to exist' are preferably processed before. Then, the order of XPath expressions to be evaluated (priority) is decided with the following criteria.

Processing to decide priority is same as in the above-mentioned case, in which a type of an evaluation execution part 1540 is TYPE 1, though priority including XPath expressions PX1, PX2, and PX3 newly added at processing at '3.' are decided.

FIG. 27 is a diagram illustrating each node of the dependency tree shown in FIG. 26 (XPath expression) added with priorities according to the above rule. FIG. 28 is a table listing XPath expressions according to the priorities shown in FIG. 27. As a common part of a plurality of XPath expressions is separated and becomes individual XPath expressions by means of the above-mentioned processing of '4.', a tree length of an XPath expression itself is not involved in the decision on priorities.

6. Construction of a Data Structure for Determination of Execution Time

XPath sets, which have been organized on the basis of dependency among XPath expressions in the above-mentioned manner, are converted into a data structure that can be referenced in matching processing with a web page (for example, a non-repeating directed graph structure) and saved in a predetermined storage device (for example, a main memory 103 shown in FIG. 1). This processing is same as that in the case, in which a type of an evaluation execution part 1540 is TYPE 1.

After a data structure to efficiently execute an evaluation of an XPath set is generated in the above-mentioned manner, an evaluation execution part 1540 evaluates with respect to a web page stored in a document storing part 1550 using the data structure.

As the evaluation execution part 1540 is in a type, in which an entire performance of a system does not significantly deteriorate even when a frequency of evaluation for XPath expression is high (TYPE 2). Therefore, an evaluation is executed in the following manner from the XPath expression at top priority in descending order.

1. Select the XPath expression at top priority among XPath expressions to be processed, and evaluate with respect to a web page. At this time, XPath expressions included in the XPath expression to be evaluated are also evaluated. If included XPath expressions have been evaluated (if they are evaluated along with the evaluation of XPath expressions in higher priorities), those evaluation results are reused.

2. If an XPath expression evaluated at '1.' matches, other XPath expressions, which depend on the XPath expression, (XPath expressions in lower priorities) will be removed from the evaluation, because they are guaranteed to match.

In contrast, if the XPath expression to be evaluated does not match, all XPath expressions included in an XPath set, which includes the XPath expression, will be removed from objectives of evaluation, because the XPath set does not match the web page. If XPath expressions included in the XPath expression to be evaluated do not match, all the other XPath expressions including the XPath expression are primarily removed from objectives of processing. A connected XPath expression, however, is not removed from objectives of evaluation, because it cannot be determined whether the connected XPath expression matches or not until all XPath expressions constituting the connected XPath expression are evaluated.

3. When processing for all of the XPath expressions unique to each XPath-set (specific XPath) has finished, the XPath set all of whose XPath expressions match may perfectly match the web page. Therefore, it is examined whether such an XPath set exists or not.

4. If such an XPath set exists, XPath expressions, which the XPath set shares with other XPath sets, are evaluated with respect to the XPath set.

In contrast, if such an XPath set does not exist, an XPath set that perfectly matches the web page does not exist either. Therefore, the processing ends here without evaluating XPath expressions, which the XPath set shares with other XPath sets.

If evaluation processing for an XPath set according to the embodiment is used for processing to decide an annotation to be added to a web page from a plurality of annotations, an annotation with an XPath set, all of whose XPath expressions are determined to match according to the above procedure, is decided as an annotation that can be added to the web page.

The above-mentioned embodiment is not generate a data structure to efficiently evaluate (optimize) with respect to all functions of XPath expressions, only optimizing a part of the functions that are in frequent use.

FIG. 29 is a diagram illustrating a structure of an XPath expression which can be optimized according to the embodiment.

In the XPath expression shown in FIG. 29, 'Ex' refers to the x'th element. 'Cx' refers to a value indicating a position within the x'th sibling, if it is represented in a 'predicate', it is equal to [position( )=Cx]. In other words, an XPath expression can be separated into two parts. If the first half of the expression (part 1 in FIG. 29) meets the following conditions, optimization according to the embodiment can be executed.

It shifts the tree up to n'th step toward its descendant, one by one.

Axis is for child only, and other axes should not be used. In addition, designation of abbreviation for 'descendant-or-self::node( )', '//' should not be used.

For 'predicate', [position( )=number] ([number] for abbreviation) can only be used.

No abbreviation for 'predicate' (/tag/).

For the latter half (part 2 in FIG. 29), any XPath expression may be appeared, though the part is not optimized.

In other words, the embodiment take advantage of a property that a structure shown above (structure which can be separated into part 1 and part 2) belongs to many XPath expressions that specify a node of a tree in a long and irregular form like HTML documents describing a web page.

In the embodiment, as a condition for an XPath set to hold it has been described that all XPath expressions within an XPath set should hold. However, in stead of requiring for such exact matching, there is another requirement for selecting 'just one that most matches'. For example, if an annotation to be added to a predetermined web page is selected in a system of adding an annotation to a web page, a situation where it cannot be transcoded may be avoided by calculating applicability of an XPath expression with a certain criteria, and selecting what is most appropriate. For this use, the embodiment can be enhanced to introduce an algorithm, which allows ambiguity in determining whether an XPath set holds or not.

Specific procedure for this algorithm will now be described.

1. At the execution time of matching by an evaluation execution part 1540, if a predetermined XPath expression does not match, a flag (UNMATCH flag) to indicate that it did not match with respect to the XPath expression is set.

2. For an XPath expression that was not evaluated because the XPath expression was included in the same XPath set with an XPath that does not match, a flag (UNEVALUATED flag) to indicate that no evaluation was executed for the XPath expression is set.

3. Evaluate all XPath expressions which is set an UNEVALUATED flag, when it is evaluated for all XPath sets do not match. (However, XPath expressions, for which evaluation results have been known from their dependency or inclusion relations, should be excluded.) For XPath expressions that do not match, an UNMATCH flag is set.

When an algorithm that allows ambiguity in determining whether an XPath set holds or not, without regard to an approach for evaluating applicability, processing up to this point is common. However, processing after this point is executed in different ways depending on evaluation approaches of applicability. An algorithm which selects 'an XPath set including the fewest number of XPath expressions which is the most unmatched,' and also 'with the greatest applicability for XPath expressions to be defined with distance on a DOM tree' will be exemplified here.

4. Select an XPath set with the fewest number of XPath expressions with an UNMATCH flag.

5. If a plurality of XPath sets, in which the number of XPath expressions with UNMATCH flags are same, exists, calculate applicability for all of XPath expressions included in each XPath set. For example, applicability A can be calculated in the following manner.

AXPath=$k_1*P+k_2*S-k_3*L$

Each parameter will be as follows:

$k_1, k_2, k_3$: constant coefficient

P: the number of steps taken to reach an existing node, when the parent sequence of the XPath expression in concern is followed.

At least a 'body' node is common even if the worst case, this parameter is guaranteed to have a value.

S: the distance of sibling sequence of the XPath expressions in concern. The distance is defined to 1 when (parent node)/tr[4] does not exist and (parent node)/tr[3] exists, while the distance is defined to 2 when (parent node)/tr[2] exists. When a sibling node does not exist, calculate a sibling node within a child node in node toward an existing parent node to be an objective of P.

When a node to be an objective is originally a first node (/tag[1]), a default value is assigned to the value.

L: a length of a tree, to which the XPath expression in concern specifies. When the distance is long, it is considered to be disadvantageous with a value such as P, so the distance is balanced out with negative coefficient.

Applicability for each XPath expression is calculated with such calculations as stated above, and the total of finally obtained applicability for each XPath expression is made to be an applicability of an XPath set.

AXPath set=ΣAXPath

With selecting an XPath set with the finally obtained value 'A' being the least value, the most applicable XPath set can be selected.

However, if such an enhancement is done, although the amount of calculation does not change in case that an XPath set holds, the amount of calculation may significantly increases in the case that no XPath set to hold exists. For this reason, the entire performance deteriorates in response to the percentage of input where holding XPath set does not exist. To avoid such a situation, it would be necessary to simplify an algorithm for calculating applicability and to maintain 'ambiguity' to make a rapid calculation possible.

As shown above, in the first and the second embodiment (hereinafter referred to as the embodiments), a processing speed with respect to an XML document is improved by efficiently searching an evaluation result of a number of XPath expressions. For example, when a number of XPath expressions are included in a style sheet, a processing speed can be improved by incorporating the embodiments into an XSLT processor.

With using an XPath to check whether an XML document has a certain part or not, news transmissions in a specified condition for each user or matching of contents with a user under a condition specified for each contents can be implemented by using an XML as a base. In this case, a large scale services could have not been implemented due to the increase in processing time in accordance with the increase in the number of XPath expressions. With the embodiments, such services can be implemented because the increase in processing time can be reduced.

Furthermore, in a system that transcodes a web page (HTML document) over a network on the basis of a predetermined annotation, by using the embodiment at searching an applicable annotation to a web page to be transcoded (an annotation with an XPath set correctly specifying an element of the web page) among a number of annotation patterns previously provided, time required for evaluating an XPath set is shortened so that processing of searching for an annotation can be executed quickly.

An XML document processing system according to the embodiment improves efficiency by taking advantage of a fact that, where a plurality of XPath expressions exist, they include redundant part such as something similar or overlapping, or what does not need an evaluation depending on the evaluation results of other XPath expressions due to the dependency. Therefore, if no such redundancy exists, efficiency will not improve.

In such a case, however, a calculation of a location path is executed in the same way as conventional procedures by using an Xalan and the like as it is, because the calculation is executed by recursively searching for node set one after another. One comparison operator is executed in a table search with entry number one. The both ways can be executed in a negligible time, which is quicker than the case of reconfiguring a node set. Moreover, if a predicate is not a predetermined pattern, it is not an objective of optimization. A test for such a case may be done by calculating in the same way as conventional procedures by using an Xalan and the like as it is.

Therefore, an evaluation of an XPath expression can be executed in efficiency virtually equal to the conventional ways even for a set of XPath expressions which has no redundant part and cannot be optimized. And, as the number of what can be optimized (XPath expressions similar to each other) increases, execution efficiency of processing will increase.

As described above, the present invention has an effect of improving execution efficiency in evaluating a plurality of XPath expressions with respect to an XML document. This effect will be remarkable as redundant part increases among the plurality of XPath expressions.

We claim:

1. A document processing computer system comprising a CPU and a main memory: said main memory comprising an XPath storing part which stores a plurality of XPath expressions; said CPU comprising a data structure-generation part for generating a data structure with redundant elements of said plurality of XPath expressions stored in said XPath-storing part being omitted; and said CPU further comprising an evaluation execution part for evaluating said plurality of XPath expressions with respect to a data file to be evaluated by using said data structure generated at said data structure-generation part of said CPU;

(a) wherein said data structure-generation part of said CPU comprises: a step decomposing means for decomposing individual said XPath expressions into steps wherein a step comprises an axis, a set of tests, and a predicate; and a tree generation means for generating a data structure, in which a step common to a plurality of XPath expressions is associated with a node by associating a node with each step obtained from the decomposition; and (b) wherein when said data structure-generation part of said CPU updates a data structure by generating a new node for a part which does not have a node corresponding to said data structure in newly added XPath expressions, whereby if an XPath expression stored in said XPath storing part of said main memory is changed to form a newly added XPath expression, said data structure-generation part of said CPU adds the new node to the data structure, and removes only a node corresponding to a part unique to the XPath expression from nodes of said data structure corresponding to a part of deleted XPath expressions.

2. The document processing system according to claim 1, wherein the data structure generation part of said CPU removes an XPath expression which overlaps other XPath expressions or an XPath expression whose evaluation result depends on other XPath expressions from objectives of evaluation.

3. The document processing system according to claim 1, further comprising a data structure-storing part of said main memory for storing and retaining a data structure generated at said data structure-generation part of said CPU, wherein said evaluation execution part of said CPU evaluates said plurality of XPath expressions by using said data structure stored in said data structure-storing part of said CPU.

4. The document processing system according to claim 1, wherein said evaluation execution part of said CPU evaluates a part corresponding to each node in said data structure, obtains a general evaluation result for individual XPath expressions by combining the partial evaluation results, and shares an evaluation result for a part corresponding to a node common to a plurality of XPath expressions in evaluating the plurality of XPath expressions.

5. The document processing system according to claim 1, wherein: said XPath storing part of said main memory stores an XPath set configured with a plurality of XPath expressions; said data structure generation part of said CPU generates said data structure with respect to said XPath included in a plurality of XPath set stored in said XPath storing part of said main memory; and said evaluation execution part evaluates individual XPath expressions by using said data structure and obtains an evaluation result for an XPath set with respect to said data file on the basis of the obtained evaluation results for XPath expressions.

* * * * *